(12) United States Patent
Ichikawa et al.

(10) Patent No.: US 8,804,172 B2
(45) Date of Patent: Aug. 12, 2014

(54) NON-TRANSITORY COMPUTER READABLE RECORDING MEDIUM STORED WITH PRINTER DRIVER UPDATING PROGRAM AND PRINTER DRIVER UPDATING METHOD

(75) Inventors: Chie Ichikawa, Suginami-Ku (JP); Nobuyuki Kimura, Chofu (JP); Junya Murashita, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 262 days.

(21) Appl. No.: 13/211,528

(22) Filed: Aug. 17, 2011

(65) Prior Publication Data
US 2012/0044534 A1 Feb. 23, 2012

(30) Foreign Application Priority Data

Aug. 18, 2010 (JP) ................................. 2010-183436
Aug. 23, 2010 (JP) ................................. 2010-186642

(51) Int. Cl.
*G06F 3/12* (2006.01)

(52) U.S. Cl.
USPC ........................................ 358/1.15; 358/1.13

(58) Field of Classification Search
None
See application file for complete search history.

(56) References Cited

U.S. PATENT DOCUMENTS

| | | | | |
|---|---|---|---|---|
| 6,952,831 | B1 * | 10/2005 | Moore | 719/327 |
| 2003/0005037 | A1 * | 1/2003 | Aija et al. | 709/203 |
| 2003/0053129 | A1 * | 3/2003 | Morooka et al. | 358/1.15 |
| 2003/0065773 | A1 * | 4/2003 | Aiba et al. | 709/224 |
| 2004/0212829 | A1 | 10/2004 | Uchida | |
| 2005/0183095 | A1 * | 8/2005 | Kujirai | 719/321 |
| 2008/0055640 | A1 * | 3/2008 | Takahashi et al. | 358/1.15 |

FOREIGN PATENT DOCUMENTS

| | | |
|---|---|---|
| JP | 2004326601 A | 11/2004 |
| JP | 2004-355596 A | 12/2004 |
| JP | 2008-165654 | 7/2008 |
| JP | 2009-187557 A | 8/2009 |

OTHER PUBLICATIONS

"Windows Point and Print", <http://download.microsoft.com/dowload/6/6/8/668b964f-f126-4a96-88db-25d842a7113f/pointandprint.doc> available from the website of Microsoft Corporation, <http://www.microsoft.com/japan/windowsserver2003/techinfo/overview/pointandprint.mspx> Jul. 2006.

HP Universal Print Driver, available from the website of Hewlett Packard, http://h20338.www2.hp.com/Hpsub/cache/343033-0-0-225-121.html.

(Continued)

*Primary Examiner* — Marivelisse Santiago Cordero
*Assistant Examiner* — Moustapha Diaby
(74) *Attorney, Agent, or Firm* — Buchanan Ingersoll & Rooney PC

(57) ABSTRACT

The printer driver updating program according to the invention causes a computer to execute a process comprising steps of confirming printer drivers for various different operating systems existing in the computer, acquiring versions of the printer drivers whose existences are confirmed, selecting an appropriate updating method corresponding to the acquired versions, and updating the printer driver according to the selected updating method.

37 Claims, 16 Drawing Sheets

(56) References Cited

OTHER PUBLICATIONS

Semiconductor IP (Intellectual Property) Related Technology, 1-3-9, 32/64 bit Microprocessor (technical name) 64 bit RISC Type Microprocessor <http://www.jpo.go.jp/shiryou/s_sonota/hyoujun_gijutsu/handoutai_ip/1-3-9.htm> available on-line from the website of Patent Office of Japan.

"Functions of Windows 7, 64 bit Support" <http://windows.microsoft.com/ja-JP/windows7/products/features/64-bit-support> available on-line from the website of Microsoft Corporation.

Japanese Office Action (Notification of Reason for Refusal) dated Dec. 17, 2013, issued in corresponding Japanese Patent Application No. 2010-183436 and an English Translation thereof the Japanese Office Action. (6 pgs).

* cited by examiner

FIG.8 ( A )
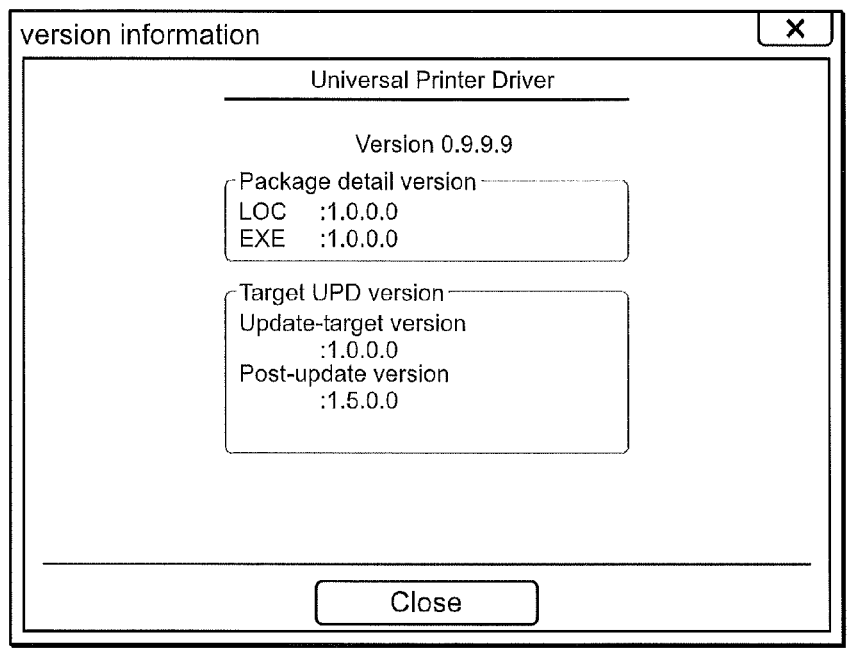
FIG.8 ( B )
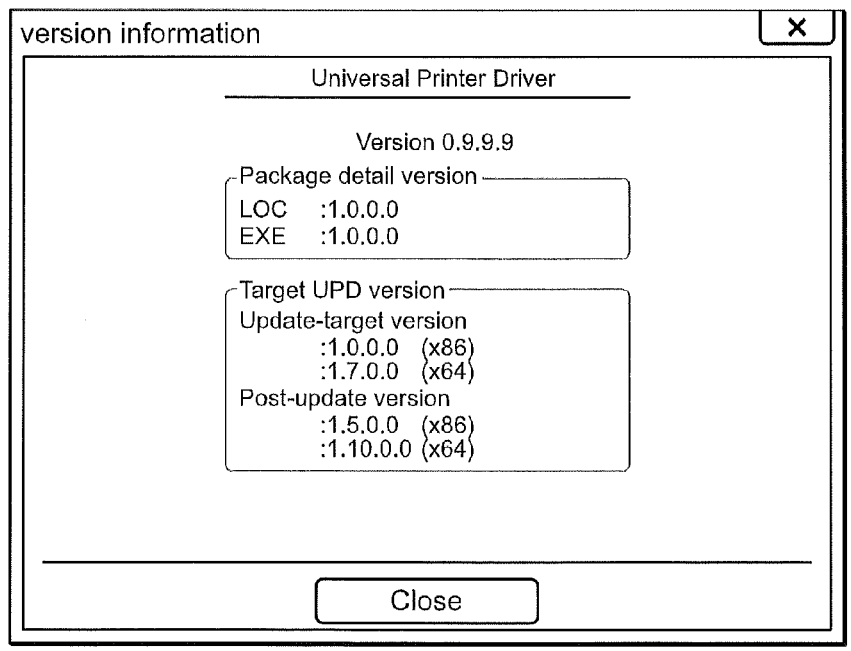

910a

910b

FIG.17 ( A )
920a
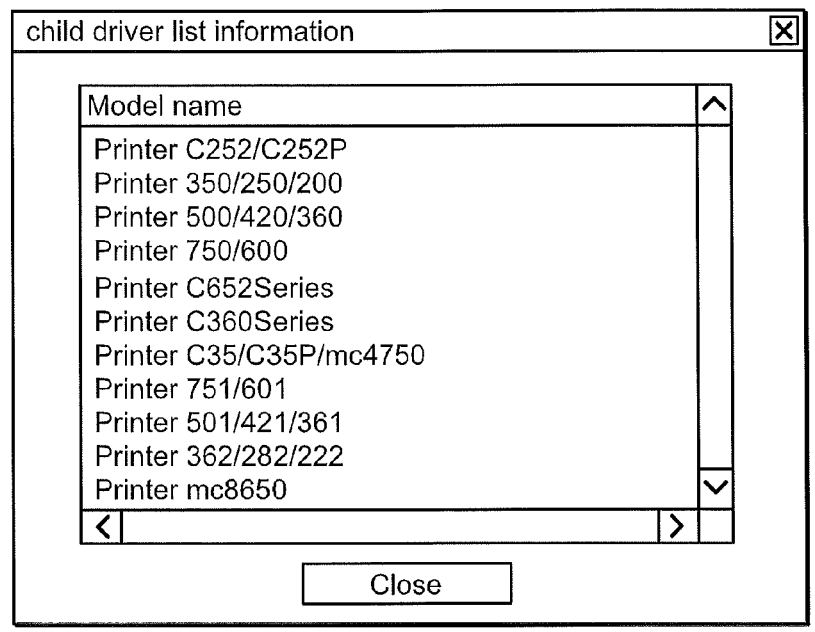
FIG.17 ( B )
920b
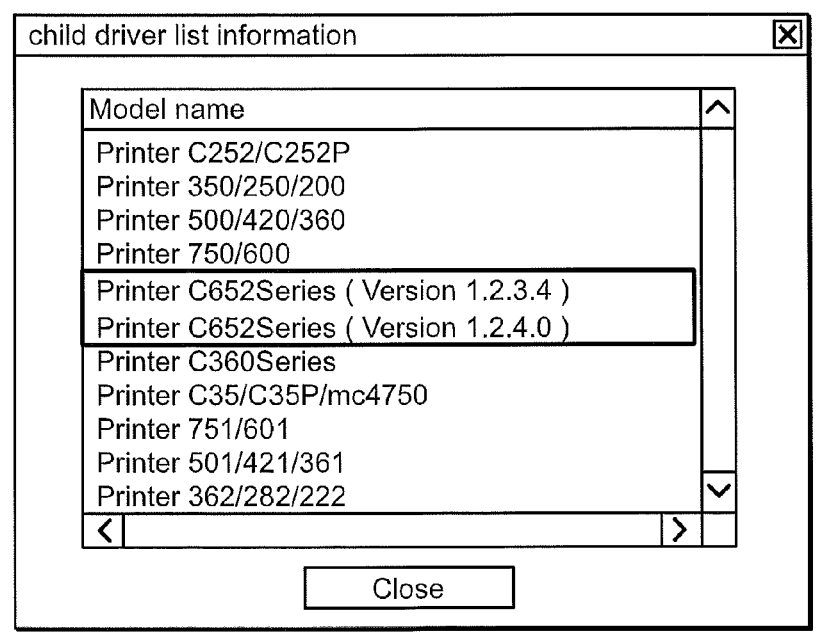

FIG.18 ( A )
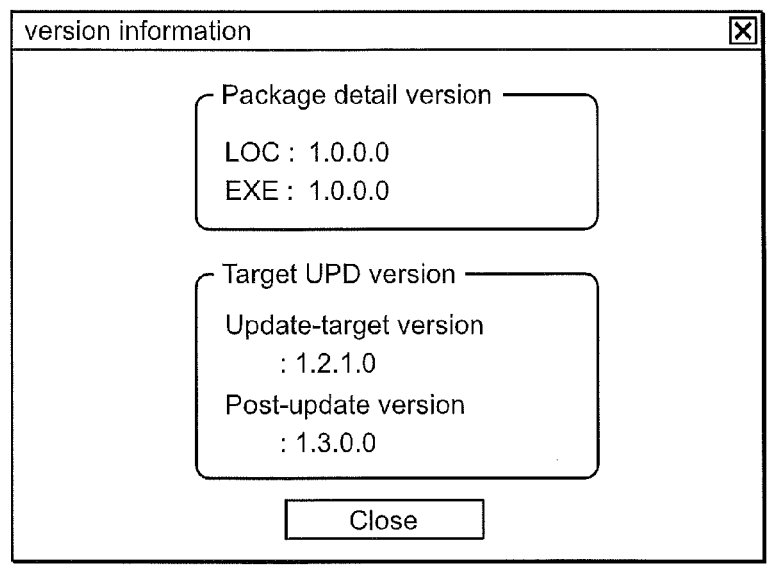
FIG.18 ( B )
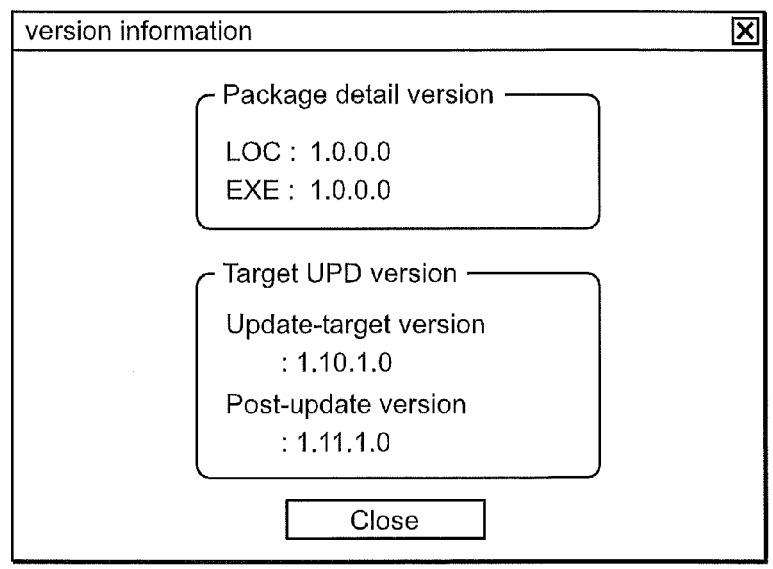

NON-TRANSITORY COMPUTER READABLE RECORDING MEDIUM STORED WITH PRINTER DRIVER UPDATING PROGRAM AND PRINTER DRIVER UPDATING METHOD

CROSS-REFERENCE TO RELATED APPLICATION

This application is based on Japanese Patent Applications No. 2010-183436 filed on Aug. 18, 2010 and No. 2010-186642 filed on Aug. 23, 2010, the contents of which are incorporated herein by reference.

BACKGROUND

1. Technical Field

The present invention relates to a non-transitory computer readable recording medium stored with a printer driver updating program and a printer driver updating method.

2. Description of Related Art

There has been a form of systems in which a plurality of computers and a plurality of printers (printing devices) are connected via a network.

One of such a form of systems using a network is a system having at least one computer (hereinafter called a "server computer") and the other computers (hereinafter called "client computers"). In such a system, when a client computer tries to use a printer, the server computer allows the client computer to use the printer. Consequently, the client computer receives a printer driver supplied by the server computer. The client computer then executes the particular printing process using the supplied printer driver (e.g., a document titled: "Windows Point and Print,"<http://download.microsoft.com/download/6/6/8/668b964f-f126-4a96-88db-25d842a7113f/pointandprint.doc> available from the website of Microsoft Corporation, <http://www.microsoft.com/japan/windowsserver2003/techinfo/overview/pointandprint.mspx>.

For such a form of system using a network, a common printer driver that is installed on one computer and allows it to execute printing on various types of printers is proposed (e.g., HP Universal Print Driver, available from the website of Hewlett Packard Company, <http://h20338.www2.hp.com/Hpsub/cache/343033-0-0-225-121.html>).

As a printer driver is one of the programs to be executed by a computer, it can be updated by modifying or adding a procedure provided as a program.

As one of such a form of updates, there is a technology of, when there is an additional module to the printer driver of the server computer, installing the module on the operating system (OS) of the server computer and notifying the existence of such an additional module to all other computers that share the printers controlled by the printer driver (Publication of Unexamined Japanese Patent Application No. 2009-187557).

Incidentally, the microprocessor which serves as the heart of a computer is changing from the currently prevailing technology of 32 bit (32 bit architecture) to 64 bit (64 bit architecture) (concerning 64 bit RISC type microprocessor, see, e.g., Semiconductor IP (Intellectual Property) Related Technology, 1-3-9, 32/64 bit Microprocessor (technical name) 64 bit RISC Type Microprocessor <http://www.jpo.go.jp/shiryou/s_sonota/hyoujun_gijutsu/handoutai_ip/1-3-9.htm> available on-line from the website of Patent Office of Japan; concerning the operating system for 64 bit processor, see, for example, "Functions of Windows 7, 64 bit Support"<http://windows.microsoft.com/ja-JP/windows7/products/features/64-bit-support> available on-line from the website of Microsoft Corporation).

As a consequence, this allows a plurality of computers having different architecture to be connected to a shared printer. In such a case, the server computer that a module is added (updated) to its printer driver can notify a client computer having the same architecture as the server computer of the update of the driver but can not do the same to a client computer having different architecture in the prior art (Publication of Unexamined Japanese Patent Application No. 2009-187557). This is because the driver suitable for the operating system of the server computer is updated but the driver for a client computer having different architecture is not updated in the server computer, as a difference in architecture calls for a different operating system.

SUMMARY

The present invention is made to solve the problems shown above. An object of the present invention is to provide a non-transitory computer readable recording medium stored with a printer driver updating program and a printer driver updating method capable of updating a printer driver for a different operating system when a printer driver for an operating system executed on one computer is updated.

To achieve at least one of the above-mentioned objects, the non-transitory computer readable recording medium stored with a printer driver updating program reflecting one aspect of the present invention, the program causes a computer to execute a process comprising: (a) confirming whether or not a printer driver for an Own OS, sometimes referred to herein as a first OS (operating system), and which is a printer driver for an operating system that operates on a computer, exists; (b) confirming whether or not a printer driver for an Other OS, sometimes referred to herein as a second OS (operating system), and which is a printer driver for the other operating system different from the operating system operating on the computer, exists; (c) acquiring each version of the printer driver for the Own OS whose existence is confirmed in the step (a) and of the printer driver for the Other OS whose existence is confirmed in the step (b) respectively; (d) selecting whether or not to update the printer driver for the Own OS and the printer driver for the Other OS respectively according to a predetermined updating method corresponding to the versions acquired in the step (c); and (e) updating said printer driver for the Own OS and/or said printer driver for the Other OS selected to be updated in said step (d).

It is preferable in the above-mentioned non-transitory computer readable recording medium that it is specified in the updating method that, when the printer driver for the Own OS exists but is not of the update-target version and the printer driver for the Other OS exists and is of the update-target version, or when the printer driver for the Own OS exists and is of the update-target version and the printer driver for the Other OS exists but is not of the update-target version, the updating process is not executed.

It is preferable in the above-mentioned non-transitory computer readable recording medium that it is specified in the updating method that, when the printer driver for the Own OS exists and is of the update-target version and no printer driver for the Other OS exists, the printer driver for the Own OS is updated.

It is preferable in the above-mentioned non-transitory computer readable recording medium that it is specified in the updating method that, when both printer drivers for the Own OS and the Other OS exist and both are of versions to be updated, both printer drivers for the Own OS and the Other OS are updated.

It is preferable in the above-mentioned non-transitory computer readable recording medium that it is specified in the updating method that, when only either the printer driver for the Own OS or the printer driver for the Other OS is a target to be updated, only the printer driver of the target to be updated is updated.

It is preferable in the above-mentioned non-transitory computer readable recording medium that the printer driver comprises a plurality of files each of which corresponds to each one of a plurality of functions, and in the step (e), the printer driver is updated by either overwriting the files that constitute the printer driver with files provided together with the printer driver updating program or by adding the files provided together with the printer driver updating program to the printer driver.

It is preferable in the above-mentioned non-transitory computer readable recording medium that the process further comprises: (f) confirming with the user whether or not the printer driver of the update-target version should be updated, prior to the execution of the update in the step (e).

It is preferable in the above-mentioned non-transitory computer readable recording medium that the step (f) is executed only when the version acquired in the step (c) is of a predetermined special specification.

It is preferable in the above-mentioned non-transitory computer readable recording medium that the printer driver is a universal printer driver that corresponds with a plurality of printers having different functions, and the files that constitute the printer driver are files of a common function part for causing a plurality of printers to execute common functions, and files of a model-specific function part for causing the printers to execute model-specific functions.

It is preferable in the above-mentioned non-transitory computer readable recording medium that the process further comprises: (g) selecting either the overwriting process for overwriting the program of a module of a new version on the program of an old version already existing in the printer driver, or the addition process for adding the program of the new version to the printer driver separately from the program of the old version, for the module which realizes the specified functions of the printer driver; and (h) updating the printer driver by executing the process selected in the step (g).

It is preferable in the above-mentioned non-transitory computer readable recording medium that the program of the new version has version information that shows the version of the program, and in the step (g), either the overwriting process or addition process is selected based on the version information of the program of the new version.

It is preferable in the above-mentioned non-transitory computer readable recording medium that the process further comprises: (i) acquiring information concerning firmware of the printer from the printer, wherein in the step (g), either the overwriting process or addition process is selected based on the information of the firmware of the printer acquired in the step (i).

It is preferable in the above-mentioned non-transitory computer readable recording medium that in the step (g), either the overwriting process or addition process is selected based on the user's operation.

It is preferable in the above-mentioned non-transitory computer readable recording medium that when the addition process is selected in the step (g), both versions of the programs of the new version and the old version are displayed respectively in addition to the names of the programs of the new version and the old version on the operating screen provided by the printer driver.

It is preferable in the above-mentioned non-transitory computer readable recording medium that when the overwriting process is selected in the step (g), the program of the old version is stored in a storage unit under a different name before the program of the old version is overwritten with the program of the new version in the step (h) so that the overwriting process can be interrupted during the execution of the overwriting process.

It is preferable in the above-mentioned non-transitory computer readable recording medium that in the step (g), either the overwriting process or addition process is selected for each of the modules of the printer driver, and in the step (h), the process selected in the step (g) is executed for each of the modules.

It is preferable in the above-mentioned non-transitory computer readable recording medium that the printer driver has the configuration information showing the modules that constitute the printer driver and the version information showing the version of the printer driver, and the configuration information and version information are modified when the printer driver is updated in the step (h).

It is preferable in the above-mentioned non-transitory computer readable recording medium that the version information of the printer driver is modified in accordance with how the printer driver is updated.

It is preferable in the above-mentioned non-transitory computer readable recording medium that the printer driver has common modules for realizing common functions for various models of printers and individual modules for realizing unique functions for each printer, and in the step (g), either the overwriting process or addition process is selected for each of the individual modules.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 8 is a drawing showing a display example of the version information.

FIG. 17 is a diagram for describing a printer driver to which a child driver of a new version is added separately from a child driver of an old version.

FIG. 18 is a diagram for describing the process of changing the version number of a printer driver.

DETAILED DESCRIPTION

The embodiments of the present invention will be described below with reference to the accompanying drawings.

First Embodiment

Figure 1:
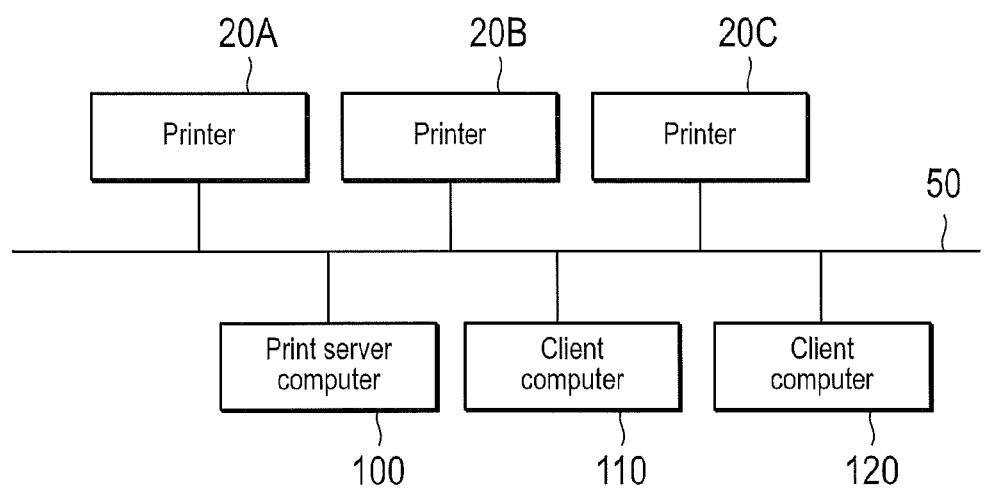
FIG. 1 is a block diagram showing the overall configuration of a printing system according to a first embodiment of the present invention.

FIG. 1 is a block diagram showing the overall configuration of a printing system according to a first embodiment of the present invention.

The printing system shown in FIG. 1 includes at least one print server computer 100, a plurality of client computers 110 and 120, and a plurality of printers (printing devices) 20A, 20B, and 20C, all of which connected with each other by a network 50.

The print server computer 100 and the client computers 110 and 120 are so-called personal computers and workstations. The basic hardware is identical in both of them. The difference between the print server computer 100 and the client computers 110 and 120 lies in their principal functions.

The print server computer 100 supplies to the client computers 110 and 120 the printer drivers that correspond to the respective operating systems of the client computers 110 and 120. The client computers 110 and 120 are used by terminal users for generating data such as texts and graphics to be printed. The client computers 110 and 120 receive printer drivers from the print server computer 100.

Printing is executed, for example, as the printer server computer 100 issues an order for the execution of printing to a specified printer after receiving a print job from the client computer 110 or 120 and converting the data (rendering of the print job) corresponding to the printer (either 20A, 20B or 20C) specified by the client computer 110 or 120. Moreover, after the data conversion (e.g., rendering of the print job) is completed by the client computers 110 or 120, the post-rendering data is sent to the print server computer 100, where the print server computer 100 issues an order for the execution of printing to the printer (description of the details of these procedures are omitted here as they are similar to the prior art, e.g., Publication of Unexamined Japanese Patent Application No. 2009-187557 as well as "Windows Point and Print" <http://download.microsoft.com/download/6/6/8/668b964f-f126-4a96-88 db-25d842a7113f/pointandprint.doc> available from the website of Microsoft Corporation <http://www.microsoft.com/japan/windowsserver2003/techinfo/overview/pointandprint.mspx>). It can also be configured in such a way in case of a printer compatible with PDL (Page Description Language) that the client computer 110 or 120 receives only a printer driver from the print server computer 100 for executing the printing from the client computer 110 or 120 by simply transmitting a print job based on PDL to the printer. Since all the above are commonly known matters so that detail descriptions are omitted here.

In the present embodiment, each of the print server computer 100 and the client computers 110 and 120 can be configured with 32 or 64 bit architecture. However, let us assume here that the printer server computer 100 has 32 bit architecture, the client computer 110 has 32 bit architecture, and the client computer 120 has 64 bit architecture. The computer of 32 bit architecture is a computer having a 32 bit microprocessor as the CPU using an integer type, a memory address, and other data size of up to 32-bit wide. Similarly, the computer of 64 bit architecture is a computer having a 64 bit microprocessor as the CPU using an integer type, a memory address, and other data size of up to 64-bit wide. Because of this architecture difference, there is a difference in the operating system. A 32 bit operating system is used for a computer of 32 bit architecture, while a 64 bit operating system is used for a computer of 64 bit architecture.

However, a 32 bit operating system can be used on a computer of 64 bit architecture. Consequently, it is also possible to use the same 32 bit operating system, which is normally used for a computer of 32 bit architecture, on a computer of 64 bit architecture. However, in describing the present embodiment, a case of a 64 bit operating system applied to a computer of 64 bit architecture is used as an example.

Although the printers 20A, 20B and 20C are printers with various functions, they do not necessarily have the same functions. For example, a printer may be compatible with PDL used to configure a print job but others may not. In another case, a printer may have an automatic both side printing function, and finishing functions such as sorting, stapling and punching functions, but other printers may not have all or a part of these functions. However, they all have the same basic functions of receiving a print job from the print server computer 100 or the client computers 110 or 120 and printing.

The network 50 is a network of various kinds consisting of a LAN (Local Area Network) that connects the print server computer 100 and network equipment with each other based on standards such as Ethernet, TokenRing, and FDDI (Fiber Distributed Data Interface), a WAN (Wide Area Network) that connects LANs via dedicated lines, etc.

The quantities of the computers and printers to be connected to the network 50 are not limited to the example shown in FIG. 1.

Figure 2:
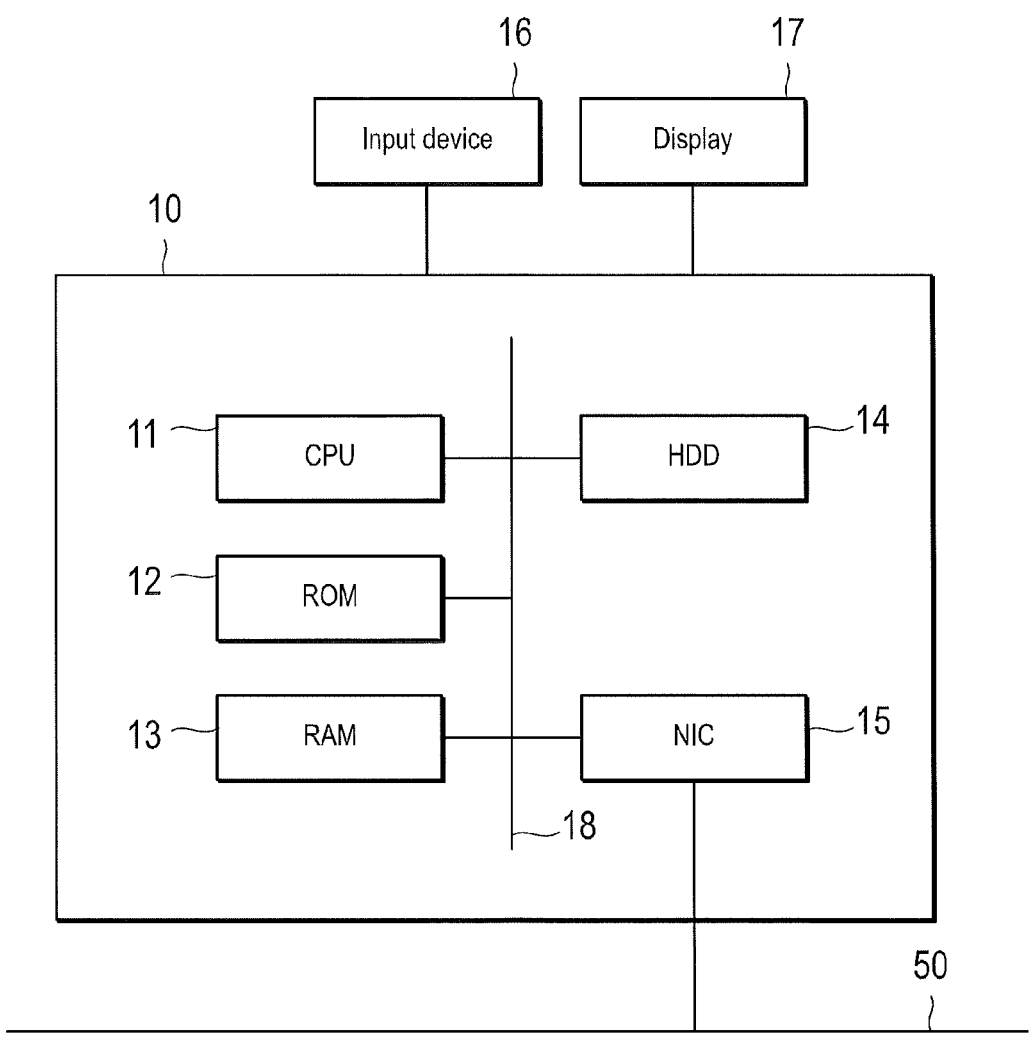
FIG. 2 is a block diagram showing a hardware configuration of a computer.

FIG. 2 is a block diagram showing a hardware configuration of the print server computer 100 and the client computers 110 and 120.

The same hardware configuration applies to all the print server computer 100 and the client computers 110 and 120 despite the fact that their architecture is different. Since these belong to the well known technology, only the outline will be described here. In FIG. 2, all these computers are collectively called as the computer 10. The computer 10 has a CPU (Central Processing Unit) 11, a ROM (Read Only Memory) 12, a RAM (Random Access Memory) 13, a hard disk 14 (HDD: hard disk drive), and a communication interface 15 (NIC: network interface card), all of which are connected with each other via a bus 18 to exchange signals. The computer is also connected to or has built in itself an input device 16 and a display 17.

The CPU 11 controls various units described above and executes multiple types of arithmetic operations in accordance with its program. The ROM 12 stores the programs necessary for starting and the basic functions of the computer 10. The RAM 13 is used as a work area for temporarily storing programs and data for the process of the CPU 11. The hard disk 14 is a nonvolatile read/writable memory device and stores various programs such as an operating system (OS), a driver program, and application programs and various kinds of data. The communication interface 15 is an interface for communicating with other kinds of equipment via the network 650 and is in charge of controlling communications with other equipments (e.g., other computers and printers) being compatible with various communication standards such as Ethernet, Token-Ring, and FDDI. The input device 16 comprises a keyboard, a pointing device, and others, while the display 17 is a display (output) device.

Figure 3:
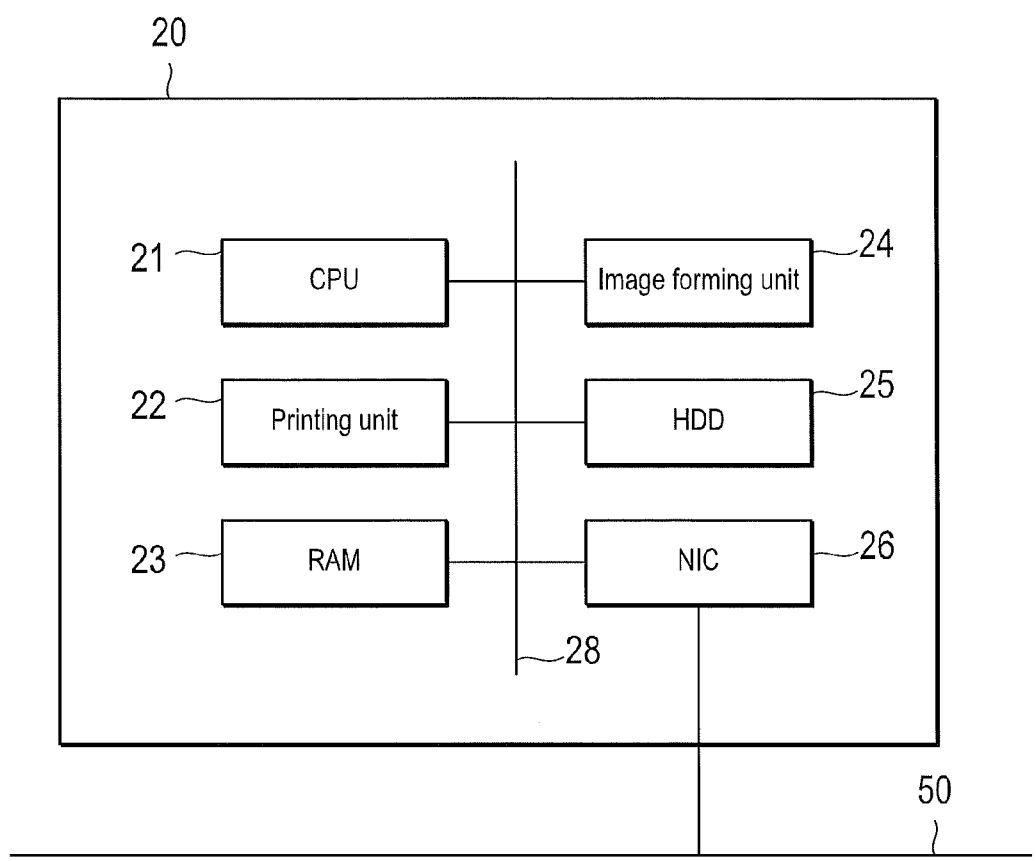
FIG. 3 is a block diagram showing a hardware configuration of a printer.

FIG. 3 is a block diagram showing the hardware configuration of the printers 20A, 20B and 20C shown in FIG. 1. As described before, the printers 20A, 20B and 20C have different functions but their basic printing functions are identical. The outline configuration of a page printer (laser printer) compatible with PDL will be described here as a typical hardware configuration of the printers. The printer 20 shown in FIG. 3 represents such a printer.

The printer 20 comprises a CPU 21, a printing unit 22, a RAM 23, an image forming unit 24, a hard disk (HDD) 25, and a communication interface 26 (NIC), all of which are connected with each other for exchanging signals via a bus 28.

The CPU 21 controls the entire printer, e.g., by analyzing the print job it has received, causing the image forming unit 24 to develop image data from the print job, and causing the printing unit 22 to print the image based on the developed image data.

The printing unit 22 prints the image based on the image data formed by the image forming unit 24 on a recording media such as a sheet of paper using the publicly known imaging process, e.g., the electro-photographic process, etc.

The RAM 23 is a volatile memory used for developing data primarily necessary for the process of the CPU 21.

The image forming unit 24 forms image data based on the print data of the print job received from the computer 10 and sends the formed image data to the printing unit 22.

The hard disk 25 temporarily stores the received print job and stores also the image data developed by the image forming unit 24 in case when the print job is PDL data.

The communication interface 26 executes communications with the computer 10 in accordance with the standard of the network to be connected to.

The printers 20A, 20B, and 20C can be not only the printers described here, but also can be those that do not have the image forming unit 24 and the HDD 25 (e.g., those that are not capable of developing data (rendering)), or ink-jet printers, rather than being limited to electro-photographic page printers.

Next, the operation of the above-mentioned printing system will be described.

First, let us describe the printer driver, which is a control program for causing the printer to execute printing. The printer driver is introduced into each of the print server computer 100 and the client computers 110 and 120. The printer driver is a program that corresponds to each kind of architecture (32 bit or 64 bit) of the print server computer 100 and the client computers 110 and 120.

Figure 4:
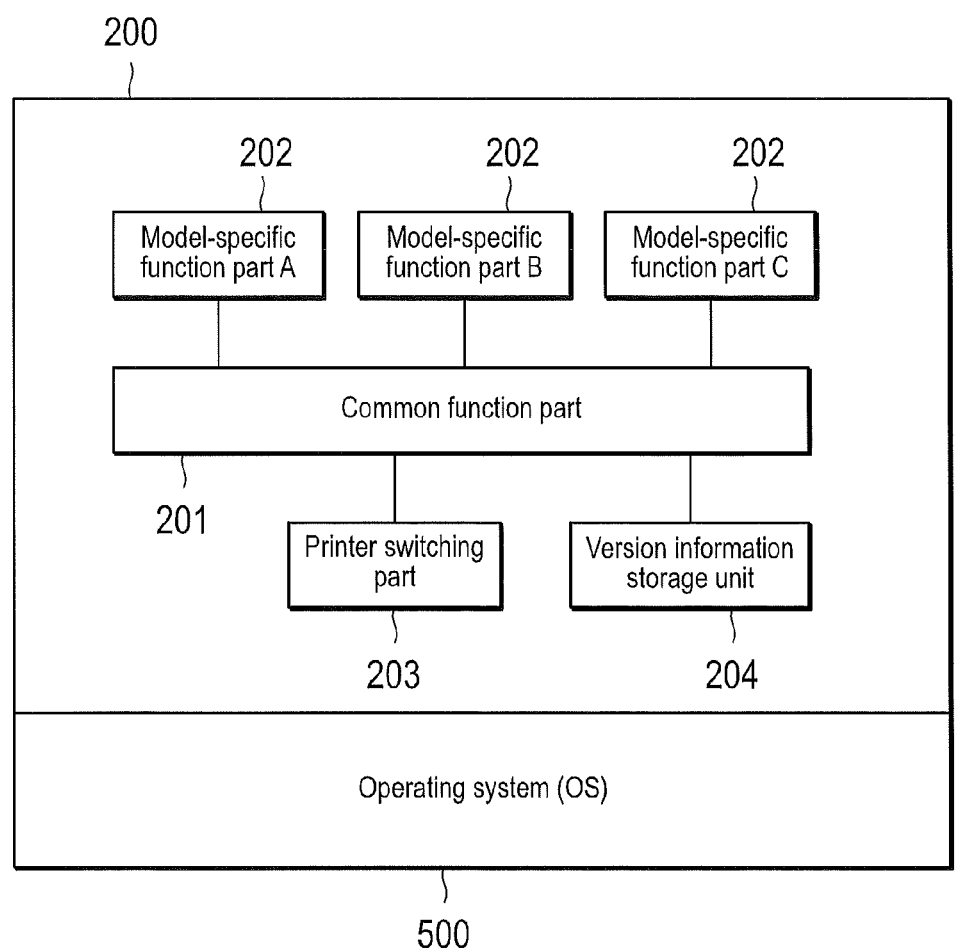
FIG. 4 is a block diagram for describing the functions of a printer driver executed by the computer for controlling a printer.

FIG. 4 is a block diagram for describing the functions of a printer driver executed by the computer for controlling a printer.

The printer driver 200 is a universal printer driver, which is compatible with a variety of printers with different functions. Its major functions include a capability to communicate with the printers via the network 50 to detect printers capable of outputting, select a printer that the user wants, make a printing setting according to the user's instruction, output the print job, and instruct a printing execution.

The printer driver 200 with such functions consists of a common function part 201, a model-specific function part 202, a printer switching part 203, and a version information storage unit 204. The printer driver 200 is constructed in such a manner that each of such functional parts is built into an operating system 500, and is called to be executed each time printing output is made.

The common function part 201 includes a function common to all the printers, and a function to control the entire printer driver. More specifically, it is in charge of core processes of the printer driver, e.g., drawing process for the printing output, control of the printing setting screen, and handling of communications between the model-specific function part, the printer switching part, and the version information storage unit.

The model-specific function part 202 is a program prepared for each model corresponding to individual functions of each printer (a group of files for executing such functions). An independent module is provided for each printer model, e.g., a model-specific function part A for the printer 20A, which is a printer of model A, a model-specific function part B for the printer 20B, which is a printer of model B, and a model-specific function part C for the printer 20C, which is a printer of model C. If there exists a plurality of printers of one model (e.g., model A), one model-specific function part A is sufficient to cover all those printers. However, if there is any difference in the functions loaded on the printers of the same model (e.g., if there are a printer equipped with a finishing function, which is an option, and a printer without such a function), it can be configured to have separate model-specific function parts 202 depending on the difference in the option functions even though they belong to the same group of model-specific function parts 202.

This model-specific function part contains the information specific to each model concerning what kind of function the printer has, in what way it is displayed on the screen, what kind of text strings is displayed on the screen, etc. The printing setting screen is displayed according to the information contained in the model-specific function part of the selected printer.

The printer switching part 203 selects a printer that will execute printing among the plurality of printers on the network, and calls up the model-specific function part 202 suitable for the selected printer via the common function part 201. The means of printer selection includes selection of a printer from a list of printer information obtained via the network, selection by directly specifying the printer's IP address and model, selection of a printer used before based on the historical data, etc.

The version information storage unit 204 stores the version information of the current printer driver. When a printer driver is updated, the version information managed there is also updated. The version information storage unit 204 is described here as a functional part, but it is simply a text file as described later. The version information is information to specify the version of the printer driver. More specifically, it includes at least its version number. It also includes, in addition to the version number, the information as which operating system the printer driver of the particular version is intended for. Moreover, it may include the release date and the name of its creator (manufacturing company, distributing company, etc.) in some cases.

Each of these functional parts is provided as a program file corresponding to an operating system and a text file that does not depend on the operating system. For example, they are provided as a file group as shown in Table 1 in Windows (registered trademark).

TABLE 1

| No. | File Name | Outline |
|---|---|---|
| 1 | UPD_1001.inf | Common function part |
| 2 | UPD_U001.unf | Common function part |
| 3 | UPD_0001.dll | Common function part |
| 4 | UPD_0002.dll | Common function part |
| 5 | UPD_1003.dll | Common function part |
| 6 | UPD_1004.dll | Common function part |
| 7 | UPD_1005.dll | Common function part |
| 8 | UPD_1001.dll | Common function part |
| 9 | UPD_1002.dll | Common function part |
| 10 | UPD_1003.dll | Common function part |
| 11 | UPD_2001.dll | Common function part |
| 12 | UPD_2002.dll | Common function part |
| 13 | UPD_2003.dll | Common function part |
| 14 | UPD_3001.dll | Common function part |
| 15 | UPD_3002.dll | Common function part |
| 16 | UPD_3003.dll | Common function part |
| 17 | UPD_4001.dll | Common function part |
| 18 | UPD_4002.dll | Common function part |
| 19 | UPD_4003.dll | Common function part |
| 20 | UPD_5001.dll | Common function part |
| 21 | UPD_5002.dll | Common function part |
| 22 | UPD_5003.dll | Common function part |
| 23 | UPD_5004.dll | Common function part |
| 24 | UPD_5005.dll | Common function part |
| 25 | UPD_5006.dll | Common function part |
| 26 | UPD_5007.dll | Common function part |
| 27 | UPD_5008.dll | Common function part |
| 28 | UPD_C001.dll | Printer switching part |
| 29 | UPD_C001.bmp | Printer switching part |
| 30 | UPD_C001.dll | Printer switching part |
| 31 | UPD_C001.exe | Printer switching part |
| 32 | UPD_C001.loc | Printer switching part |
| 33 | UPD_C001.cfg | Printer switching part |
| 34 | UPD_version.ver | Version information storage unit |
| 35 | driver01.dll | Model-specific function part A |
| 36 | driver02.dll | Model-specific function part B |
| 37 | driver03.dll | Model-specific function part C |

Table 1 shows in general which of the functional parts each of the files represents.

The files with extensions "exe" and "dll" are program files that are read out and executed by the operating system. These program files are created specifically for the operating system which executes them and can not be executed for a different operating system. On the other hand, files with other extensions ("inf," "bmp," "loc," "ver," etc.) are files storing parameters necessary for the operations of the printer driver and user interface images, etc., whose contents are visible even when the operating system is different. In particular, the "UPD_version.ver" file is a file that stores the version information (version information storage unit). Thus it is attached with the extension "ver" in order to identify it clearly. The reality of this file is a simple text file so that its contents can be viewed using other operating systems. Consequently, the version of a printer driver can be checked by viewing the contents of this file even if the printer driver is intended for another operating system.

Next, let us describe the updating procedure of the printer driver.

The printer driver 200 is updated to a new version when it is required to correct or add the program contents. The updating is done by rewriting or adding files for the entire printer driver or each functional part. More specifically, each file shown in Table 1 is rewritten or added according to the contents of updates. The correction of the program contents here is done primarily for the purpose of removing bugs and optimizing the function. On the other hand, the addition includes an addition of new function as a whole, an addition of a new printer model, an addition of a function of a specific printer model, etc.

These updating processes are done by executing the printer driver updating program. The outline of the function of the printer driver updating program is described below.

The printer driver updating program checks whether or not the printer driver, which is the object of the update, is installed on its own operating system (herein after referred to as "Own OS"). Also, it checks whether or not the printer driver for other operating systems (hereinafter referred to as "Other OS") is installed. It further checks each printer driver's version and executes a proper updating process for each of the printer drivers for the Own OS and the Other OS (no updating process is executed in case updating is unnecessary). The printer driver updating program is also used for writing the post-update version information after an update is completed, displaying the before-and-after version information, etc.

The printer driver for the Own OS here means a printer driver which is provided commonly to the Own OS of the server computer as well as to the operating systems, which has identical architecture as that of the Own OS, installed on other computers. The printer driver for the Other OS means a printer driver installed in addition to the Own OS so that it can be provided commonly to the operating systems of architecture, which is different from that of the Own OS, installed on other computers. The printer driver for the Other OS is to be used solely on the Other OS and cannot be executed on the Own OS (although the version information, etc. of the printer driver for the Other OS can be checked).

The printer driver updating program is installed and operated on the print server computer 100. Consequently, it is provided as a program to operate under the operating system of the printer server computer 100.

The printer driver updating program having such a function is provided as a package consisting of, e.g., a file of update execution program itself as well as a group of files used for updating.

Figure 5:
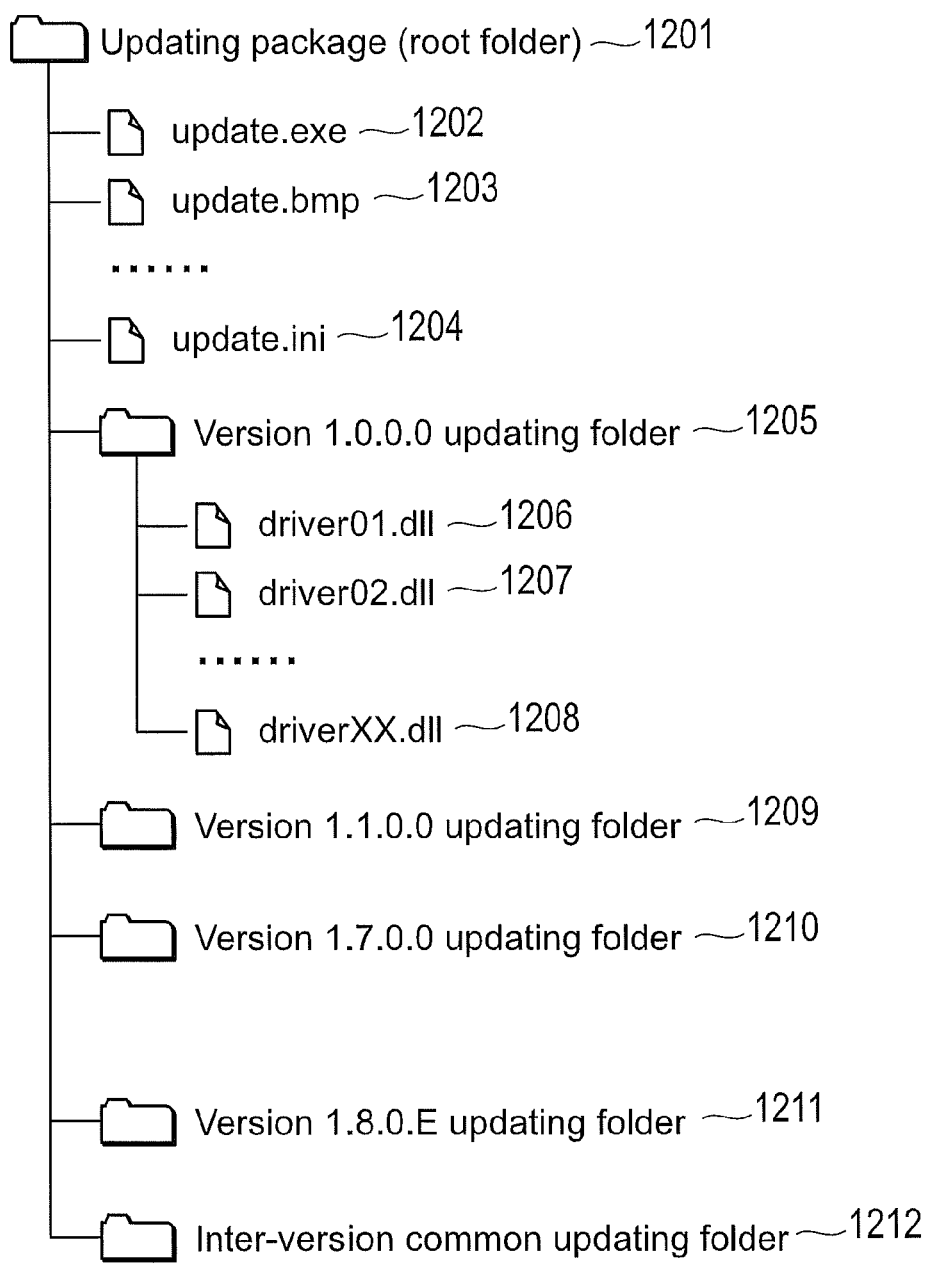
FIG. 5 is a diagram showing an example of printer driver updating program package.

FIG. 5 is a diagram showing an example of printer driver updating program package. This example is a case where the operating system is the Windows (registered trademark) operating system (hereinafter simply referred to as Windows) manufactured by Microsoft (registered trademark).

As shown in the diagram, the package of this printer driver updating program is bundled in a root folder 1201. A printer driver update program itself, "update.exe" 1202 and a group of files required for the updating process located immediately below the root folder 1201. The group of files required for the updating process include a bitmap file "update.bmp" 1203 of the user interface screen which is displayed at the time of the updating process, and an update information file "update.ini" 1204 containing the version of the printer driver which is the target to be updated in this package (update-target version), the version of the printer driver after the update for each update-target version (post-update version), the updating method, and the contents of this package.

The updating process is implemented according to the procedure which will be described later as the "update.exe" 1202 is executed.

In addition, a group of other files necessary for the updating process such as a file for defining text strings which are displayed at the time of updating although they are not shown.

Furthermore, folders containing files for updating (referred to as updating folders) 1205, 1209-1212 are located below the root folder. The updating folders are prepared for each update-target version. In other words, updating is done by using files contained in an appropriate updating folder depending on the version of the printer driver currently installed. The contents are such that, for example, the "version 1.0.0.0. updating folder" 1205 contains updating files for update-target version "1.0.0.0." The particular folder contains files "driver01.dll" 1206, "driver02.dll" 1207, . . . "driverXX.dll" 1208 as the files which correspond to the model-specific function part and will be actually updated.

Other folders 1209-1211 also have similar contents and are prepared for update-target versions as shown in the diagram. Also, there is a "inter-version common updating folder" 1212 storing updating files that are commonly applicable to all the versions or some of the versions.

For these updating folders and files contained therein, folders and files necessary for updating that are not shown in the diagram may be stored.

Figure 6:
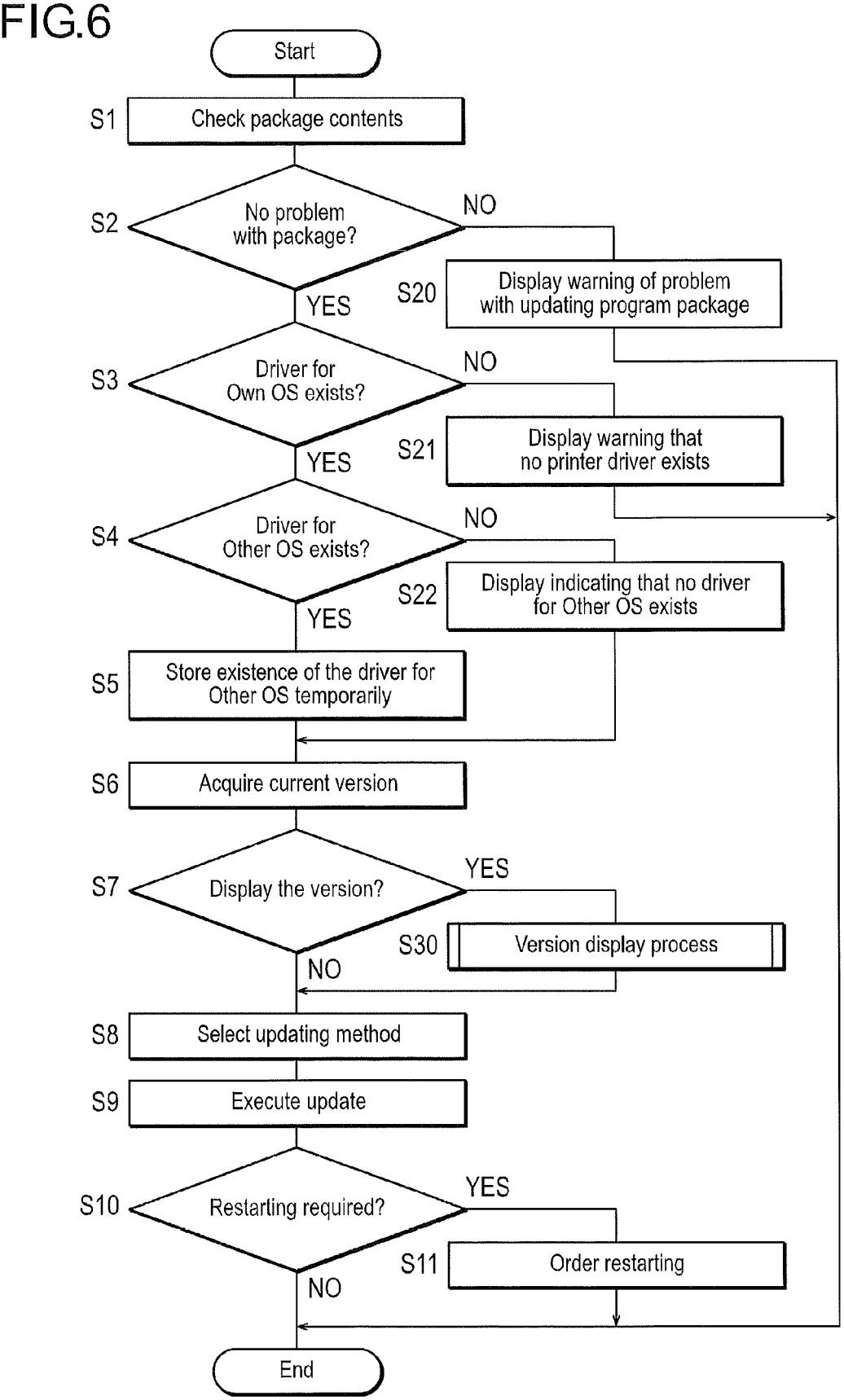
FIG. 6 is a flowchart showing the procedure of the printer driver updating program.

Now let us describe the updating operation of the printer drivers in accordance with the printer driver updating program. FIG. 6 is a diagram showing the procedure of the printer driver updating program. The sequence shown here is executed by the print server computer 100. In more details, incase of the file shown as an example in FIG. 5, the entirety of the root folder 1201 is first stored in the hard disk 14 of the print server computer 100. The CPU 11 of the print server computer 100 executes the printer driver updating program "update.exe" 1202.

The CPU 11 of the print server computer 100 (hereinafter simply referred to as CPU 11 in the description of this procedure) activates the printer driver updating program. At this stage, if the printer driver updating program is designed for an operating system of different architecture, such will be displayed as a warning by the operating system and it will not be activated as it can not be activated if it is designed for an operating system of different architecture. This is a normal action of the operating system.

The case when the printer driver updating program is activated normally will be described below.

After activating the printer driver updating program, the CPU 11 checks if there is any problem in the package contents of the updating program (S1). More specifically, the package contents described in the update information file ("update.ini" 1204 shown FIG. 5) and the folder and file names actually residing in the root folder are checked. At this stage, if there is any problem such that necessary folders or files supposed to be in the package are missing (S2: No), the process is terminated. Such a status should preferably be displayed as a message (S20).

Next, it is checked whether or not the printer driver exists (is installed) (S3-S4). The judgment is made by checking the location where the printer driver is supposed to be located in the system folder of the operating system. The printer drivers for the Own OS and the Other OS are managed in different folders corresponding to each environment in the system folder. The existence of each respective printer driver for the Own OS and the Other OS is checked concerning the printer drivers installed there. By checking, for example, the contents of the version information storage unit of the printer driver (more specifically the contents of the "UPD_version.ver" file shown in Table 1), it is possible to check the existence of the printer driver as well as the version. However, if it needs to check only the existence of the printer driver, it is suffice to check whether or not the printer driver is installed on the system folder.

In the process of S3-S4, the existence of the printer driver for the Own OS is checked first (S3), and the process is terminated if it does not exist (S3: No). At that time, it can also be configured in such a way that a warning is issued to alert the user that the printer driver to be updated does not exist (S21). If the printer driver for the Own OS to be updated exists (S3: Yes), the existence of the printer driver for the Other OS to be updated is then checked continuously (S4). If the printer driver for the Other OS does not exist (S4: No), that fact is displayed (S22) and it moves on to the next process. However, if the printer driver for the Other OS to be updated exists (S4: Yes), that fact is stored temporarily in the memory (S5) and it moves on to the next process.

By the way, in the process of S3-S4, so long as the printer driver for the Own OS exists, it is judged at this stage that the printer driver to be updated exist including a case when the particular version needs not to be updated, regardless of whether the printer driver for the Other OS exists or not. On the other hand, if it is judged in S3 that the printer driver for the Own OS does not exist, the process is terminated without checking the existence of the printer driver for the Other OS. This is because of the fact that, in the Point and Print of prior art, it is constituted in such a manner that the printer driver for the Other OS can not be installed unless the printer driver for the Own OS is installed. In other words, there is no possibility of having only the driver for the Other OS installed although it is possible to have only the driver for the Own OS installed. This is true even in a case where the Point and Print technology is not adopted, as the computer does not function as the print server if the printer driver for the Own OS does not exist. Therefore, it is acceptable to terminate the process at this point for such a computer, since there is no chance of having only the printer driver for the Other OS installed. In other words, it is preferable to terminate the process at this point because it is a waste of processing time and computer resources in case when the printer driver for the Own OS is not installed (regardless of whether the Point and Print technology is adopted or not).

Next, the CPU 11 acquires the current version (current version information) of the detected printer driver (S6). More specifically, the current version information is acquired by checking the "UPD_version.ver" file of the installed printer driver. The acquired current version information (only the version number suffices) is temporarily stored in the memory. In the process of S6, the current version information of the printer driver for the Other OS is acquired, not just the one of the printer driver for the Own OS, if the printer driver for the Other OS exists based on the temporary memory of S5. If the information of the existence of the printer driver for the Other OS is not stored in the memory in S5, the version of the printer driver for the Other OS is not acquired.

Next, the CPU 11 checks whether or not there is a user's order to display the version information (S7), and displays the version information before and after the update at this stage by executing the process of a subroutine S30, if there is a version information display order is entered (S7: Yes). Although the detail of this process will be described later, it is possible to avoid (interrupt) the update if it is not intended by the user by displaying the version information before and after the update at this stage.

If the version information display order is not entered at S7 (S7; No), and the program is returned after the process is completed in S30, the CPU 11 acquires the updating method suitable for the version of the printer driver currently installed (S8) assuming that the update execution order is issued, and executes the updating process based on its contents (S9).

Table 2 shows the updating method in S8. In S8, a judgment is made as to whether or not the updating should be made according to the updating method specified in Table 2. Although a table format is used in Table 2 in order to make this updating method more understandable, it is described in actuality in the update information file "update.ini" 1204 in such a format as to be able to be processed by the CPU 11.

TABLE 2

| No. | Update Target Own OS | Update Target Other OS | Updating Method | Message |
|---|---|---|---|---|
| 1 | ○ | — | Update without message | [No message] |
| 2 | ○ | ○ | Update without message | [No message] |
| 3 | ○ | Δ | Update after confirmation | Driver for Other OS is special. Continue on updating? |
| 4 | ○ | X | No updating | Driver for Other OS is not an update-target. Update will be interrupted. |
| 5 | Δ | — | Update after confirmation | Driver for Own OS is special. Continue on updating? |
| 6 | Δ | ○ | Update after confirmation | Driver for Own OS is special. Continue on updating? |
| 7 | Δ | Δ | Update after confirmation | Both drivers for Own and Other OS are special. Continue on updating? |
| 8 | Δ | X | No updating | Driver for Other OS is not an update-target. Update will be interrupted. |
| 9 | X | — | No updating | Driver is not an update-target. Update will be interrupted. |
| 10 | X | ○ | No updating | Driver is not an update-target. Update will be interrupted. |
| 11 | X | Δ | No updating | Driver is not an update-target. Update will be interrupted. |
| 12 | X | X | No updating | Driver is not an update-target. Update will be interrupted. |
| 13 | * | — | No updating | Driver is not an update-target. Update will be interrupted. |
| 14 | * | ○ | Update only Driver for Other OS without message | [No message] |
| 15 | * | Δ | Update only Driver for Other OS after confirmation | Driver for Other OS is special. Continue on updating? |
| 16 | * | X | No updating | Driver for Other OS is not an update-target. Update will be interrupted. |

In S8, judgments are made as to whether or not the update will be made according to the updating method shown in Table 2 in accordance with the presence or absence of the printer driver to be updated checked in S3 and S4 and the current version information acquired in S6.

The conditions of choosing whether to update or not can be classified to five cases (No. 1 to No. 5 shown below).

No. 1 case is when the update-target version exists. This is shown by "o" mark in Table 2. This represents a case in which the printer driver is installed and the confirmed current version is also the target of the update.

No. 2 is a case when the warning version exists. This is shown by "Δ" mark in Table 2. This is a case when the current version confirmed in S6 is the target of the update but it is of a special specification. A printer driver of a special specification is that a special customization is added. When such a printer driver of a special specification is updated, the customized function may be wiped out by the update. In order to avoid such a problem, the system is provided with a means to warn the user about the risk and let the user choose either to update the customized item or not. A judgment is made as to whether or not a printer driver is of a special specification by checking whether or not the version described in the update information file "update.ini" 1204 is identical to the version acquired in S6 and also whether or not a version number (including suffix, etc.) to show that it is of a special specification is added to the version information acquired in S6.

No. 3 is a case when a version that is not to be updated exists. This is shown by "X" mark in Table 2. This is a case when the current version acquired in S6 is not the update-target version.

No. 4 is a case where a judgment is made only for the printer driver for the Own OS and shows that the printer driver for the Own OS is already updated. This is shown by "*" mark in Table 2. This is a case when the current version acquired in S6 is identical to the post-update version described in the update information file "update.ini." 1204.

No. 5 is a case when a judgment is made only for the printer driver for the Other OS and is shown by "−" mark in Table 2. This is a case when the printer driver for the Other OS is not installed. In other words, it is a case when the fact that the printer driver for the Other OS exists is not stored in S5.

As can be seen from Table 2, no update is made on either of the printer driver for the Own OS and the Other OS, if there is the update-target version exists only on one of the printer drivers for the Own OS and the Other OS (Nos. 4, 8, 10 shown in Table 2) in the present embodiment. This is because printing is executed basically via the print server computer 100 in the present printing system. As a result, a problem can occur when the versions of the print server computer 100 (Own OS) and the client computer 120 (Other OS) connected thereto are of different versions. Not only that but also it is difficult from the system management standpoint to have to manage a case where the version used for the print server computer 100 is different from the version used for the client computers 110 and 120. Therefore, in order to avoid a case of updating the two computers having of different versions, updating is avoided if the update-target version is detected on only one of the two. Moreover, for the same reason, if a printer driver being a target of the warning is not updated, the other printer driver to be updated is also not updated (Nos. 3 and 6 in Table 2) in case when one of the two is the target of a warning.

To summarize the updating method shown in Table 2, it is ruled that, when a printer driver for the Own OS exists and is of the update-target version and no printer driver for Other OS exists, the printer driver for the Own OS is updated. Also, it is ruled that, when a printer driver for the Own OS exists but is not of the update-target version and a printer driver for the Other OS exists and is of the update-target version, or when a printer driver for the Own OS exists and is of the update-target version and a printer driver for the Other OS exists but is not of the update-target version, the updating process is not executed. Moreover, it is ruled that, when both printer drivers for the Own OS and the Other OS exist and both are of update-target versions, both printer drivers for the Own OS and the Other OS are updated.

Alternatively, if, for example, the client computer 120 (Other OS) can print on its own (i.e., without relying on the print server computer 100), it can be configured in such a way as to update only one of the printer drivers if only one of them is to be updated, as it is allowable for the two printer drivers to be of different versions so long as there is no managerial problem.

After the updating method shown in Table 2 is selected in S8, the CPU 11 executes the updating process (either to update as is, or update after warning, or not to update) according to the selected update contents (S9). At this time, it is preferable to display one of the messages shown in Table 2. Displaying the message makes it easier for the user to understand how the update is made.

Next, the CPU 11 makes a judgment as to whether or not restarting is required as a result of the update (S10). If restarting is required at this point, the operating system is ordered to execute restarting (S11). On the other hand, if restarting is not required, the process is terminated at that point.

In making a judgment as to whether or not it is required to restart the computer (OS in reality) to complete the updating process after executing the updating process in S9, it is judged that restarting is required if the files with "exe" and "dll" extensions are overwritten or added concerning the printer driver for the Own OS. On the other hand, if only those other files are updated, restarting is not required. Also, restarting of the Own OS is not required if the printer driver for the other OS is updated.

In the updating process in S9, updating is executed for each updating folder included in the package (root folder) where the printer driver updating program is included together. Therefore, it can flexibly adapt to the model-specific function part which is configured differently depending on each version in case of a universal printer driver as its model-specific function part is constituted independently. Thus, it is possible to update only the necessary minimum portions (folders and files). This makes it possible to minimize the number of cases that require computer restarting after the update.

Figure 7:
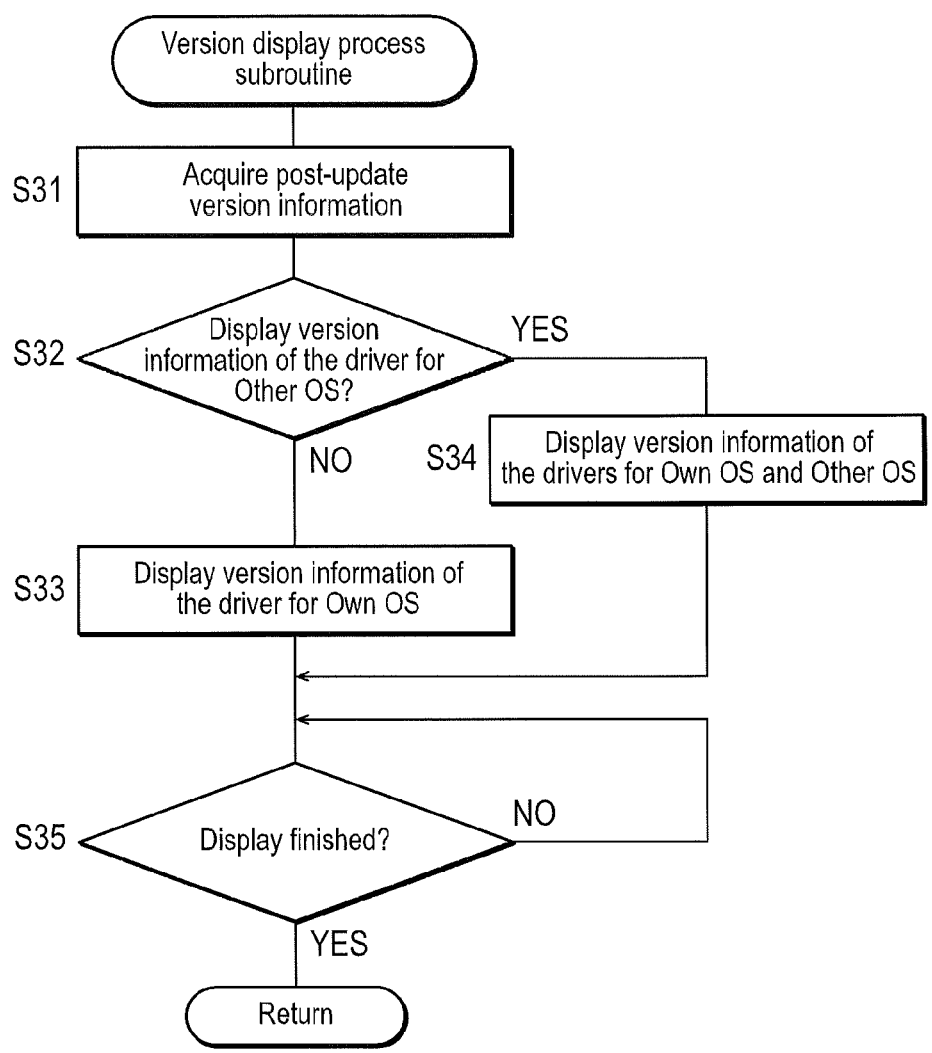
FIG. 7 is a sub-routine flowchart showing the procedure of a version information display process.

Next, let us describe the procedure of displaying the version information. FIG. 7 is a sub-routine flowchart showing the procedure of a version information display process.

Upon receiving the version information display order in S7, the CPU 11 acquires the post-update version information from the update information file based on the current version information of the printer drivers for the Own OS and the Other OS acquired in S6 (S31). The update information file is "update.ini" 1204 in case of Windows as described before.

The version information described in this update information file is, for example, as shown in Table 3.

TABLE 3

| No. | Current Version | Post-update Version |
|---|---|---|
| 1 | 1.0.0.0 | 1.5.0.0 |
| 2 | 1.1.0.0 | 1.5.0.0 |
| 3 | 1.7.0.0 | 1.10.0.0 |
| --- | --- | --- |
| N | 1.8.0.E | 1.10.0.E |

In the present embodiment, printer drivers of a plurality of versions are made targets of a single updating program. Table 3 holds a current version, i.e., the version prior to the update and post-update version information corresponding to each thereof for each of N-piece versions. Based on this information, if an update is attempted in an environment where the printer driver for the Own OS having a current version of "1.0.0.0" is installed, a post-update version of "1.5.0.0" is acquired, for example. When a printer driver for the Other OS exists, a post-update version is acquired same as well as in the case of the Own OS. For example, if a printer driver for the Other OS having a version of "1.7.0.0" is installed, a post-update version of "1.10.0.0" is acquired for the printer driver for the Other OS.

Whether the update-target version is for the Own OS or the Other OS, in other words, whether it is for the 32 bit architecture or the 64 bit architecture in the present embodiment, can be checked by knowing a folder for which environment is opened, as the printer drivers for the Own OS and the Other OS are managed by separate folders corresponding to each environment within the system folder as mentioned before.

It can also be configured in such a manner as to write in the update information file "update.ini" 1204 the information depending on each version of the current update target and to make a judgment based on it.

For example, it may be preferable to add a suffix and the like to the version number to identify a particular OS (suffix such as "x86" for 32 bit architecture, and "x64" for 64 bit architecture, etc.). It can also be configured to have the name of the OS itself in lieu of the suffix with the version number. This makes it possible to display the version information before and after the update by merely acquiring the contents of the update information file.

Next, the CPU 11 makes a judgment as to whether or not the version information for the Other OS is necessary to be displayed (S32). This process causes it to judge that the version information for the Other OS is displayed in case when the fact that the printer driver for the Other OS exists is temporarily stored in S5. Therefore, the version information of the printer driver for the Other OS is not displayed in case when the fact that the printer driver for the Other OS exists is not temporarily stored in S5.

Based on the acquired version information, the CPU 11 displays the version information for the Own OS if it is judged in S32 that it is not necessary to display the version information for the Other OS (S33), while it displays the version information for the Other OS as well as the same for the Own OS if it is judged in S32 that it is necessary to display the version information for the Other OS (S34).

FIG. 8 is a drawing showing a display example of the version information. FIG. 8(a) is a display example of the version information for the Own OS only. In other words, it is a display example when it is confirmed that the printer driver for the Other OS does not exist in S32. As can be seen here, the update-target version "1.0.0.0" as the target UPD version (UPD stands for universal printer driver) and the post-update version "1.5.0.0" are displayed below the updating package version "version0.9.9.9" containing this printer driver updating program, as well as the package detail versions "LOC: 1.0.0.0" and "EXE:1.0.0.0."

FIG. 8(b) shows a case where the version information for the Other OS shown as well. In other words, it is a display example when it is confirmed that the printer driver for the Other OS exists in S32. As shown here, the information of the current version and the post-update version of the printer driver for the Other OS is displayed in addition to that of the printer driver for the Own OS. The update-target version "1.0.0.0 (x86)" and "1.7.0.0 (x64)" as well as the post-update version "1.5.0.0 (x86)" and "1.10.0.0 (x64)" are displayed indicating the Own OS as x86 environment and the Other OS as x64 environment respectively.

After displaying them, the CPU 11 returns to the main routine (advance to S8) by terminating the display of the screen of the version information if there is a termination order of the version display (pressing the "Close" button in FIG. 8) by the user (S35: Yes).

Thus, it is possible to check both versions, i.e., of the Own OS and the Other OS, on the server computers by displaying the version information for not just the printer driver for the Own OS but also for the Other OS. This makes it possible to manage both the versions of the Own OS and of the Other OS easily by accessing them on the server computer without having to check the client computer.

As described above, it is shown here a case where only the version information for the Own OS is displayed (FIG. 8(a) case) if the existence of only the printer driver for the Own OS is confirmed, while the information for both the Own OS and the Other OS versions is displayed if both of them are confirmed (FIG. 8(b) case).

However, the version information display is not limited to the one shown above, but can also be configured in such a manner, for example, as to display only the version information for the Other OS, if only the printer driver for the Other OS will be updated while it is confirmed that both printer drivers for the Own OS and the Other OS exist. The case that only the update is made only for the Other OS, which is exemplified here, is a case, for example, the post-update version is described only for the Other OS version as the new and old version information. Another possibility is a case where the displaying step is implemented after S8 described before and the update is made essentially only for the Other OS according to the updating method indicated in Nos. 14 and 15 of Table 2. Alternatively, it is a case where only the one for the Other OS can be updated as shown in No. 10 of Table 2.

The present embodiment described in the above provides the following effect.

In the present embodiment, an appropriate update is implemented after confirming the existence of printer drivers for a plurality of different operating systems installed on the print server computer as well as their update-target versions corresponding to them. By doing so, it is possible to update the printer drivers of a plurality of different operating systems installed on a print server computer in one shot.

Also, since it is made as an updating package containing a printer driver updating program so that it can handle a plurality of versions, it is possible to rewrite or add updating files suitable for those of the update-target versions after judging each printer driver's version in conducting updates.

Also, it does not cause any managing problem nor mismatch due to difference in versions as it updates by matching the versions for the Own OS and the Other OS.

Also, folders and files that constitute a printer driver to be updated are rewritten or added individually, so that the change is limited to a minimum and the need of restarting of the operating system can be minimized.

Although the present invention was described in the above using an embodiment, the present invention should not be construed to be limited to the above embodiment. For example, although a universal printer driver is used as an example in the above embodiment, it is not limited to it, but can be applied in updating conventional printer drivers for both the Own OS and the Other OS by executing the above-mentioned process.

Also, in the above embodiment, although a case of computers with different architecture is described as the difference between the Own OS and the Other OS, it can also be applied to a case where the two operate on different operating systems although they are built on the identical computer architecture. For example, it is possible to update the printer drivers which are designed on Windows for the Own OS and on UNIX for the Other OS by implementing the same process as in the embodiment described above. It goes without saying that printer drivers of various other operating systems can be updated as well.

Moreover, in the above-mentioned embodiment, the update information file describing the updating method is provided by placing it in a same package together with the printer driver updating program. This way, the updating method is delivered always together with the printer driver updating program.

However, the contents of the updating method can be written, for example, as a program code in the printer driver updating program itself. Updating can be done according to the proper updating method as the printer driver updating program is executed this way as well.

It is also possible to provide the printer driver update program separately from the update information file (including the updating method) and the updating folder (or updating file). For example, it can be done by providing the printer driver updating program ahead of time (or having it in the computer with the printer driver), and storing the update information file and the updating folder in an external server. Next, execute the printer updating program to fetch the update information file and the updating folder at the external server at a certain point of time between the time when the step S3 becomes Yes through the step S8 (the external server here means a computer which is other than the print server computer 100 and is capable of receiving and sending data via the network 50). Updating can be done according to the proper updating method as the printer driver updating program is executed this way as well.

The present invention shall not be construed to be limited by the embodiment described above but rather it can be modified in a various way within the claims.

Second Embodiment

Figure 9:
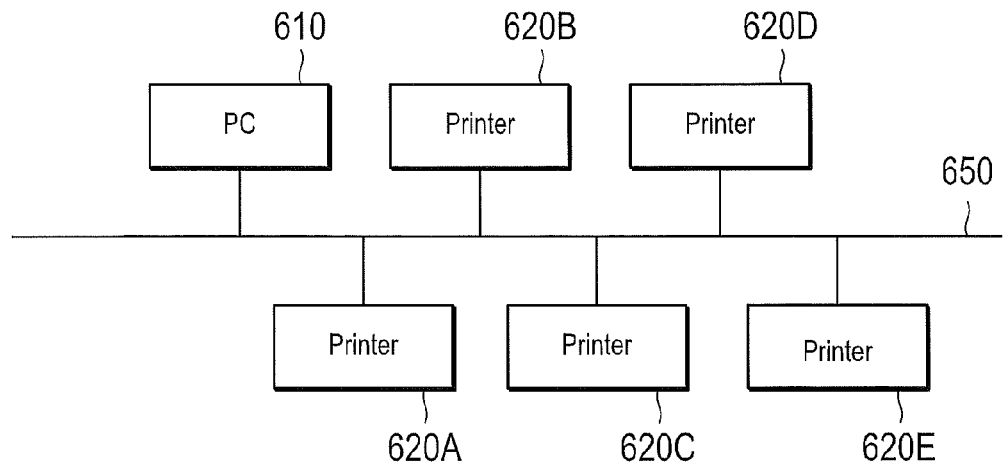
FIG. 9 is a block diagram showing the overall configuration of a printing system according to a second embodiment of the present invention.

FIG. 9 is a block diagram showing the overall configuration of a printing system according to a second embodiment of the present invention.

The printing system of the present embodiment is equipped with PC 610, printers 620A, 620B, 620C, 620D, and 620E. The PC 610 and the printers 620A-620E are connected via a network 650 so that they can communicate with each other.

The network 650 consists of various types of networks including LAN having computers and network equipment connected based on standards such as Ethernet, TokenRing, and FDDI, as well as a WAN that connects LANs via dedicated lines, etc. The types and quantities of equipment to be connected to the network 650 are not limited to the example shown in FIG. 9. Also, the printers 620A-620E include image forming devices such as MFP (Multi-Function Peripheral), etc. Moreover, the printers 620A-620E include printers of the same model but with firmware (FW) of different versions.

Figure 10:
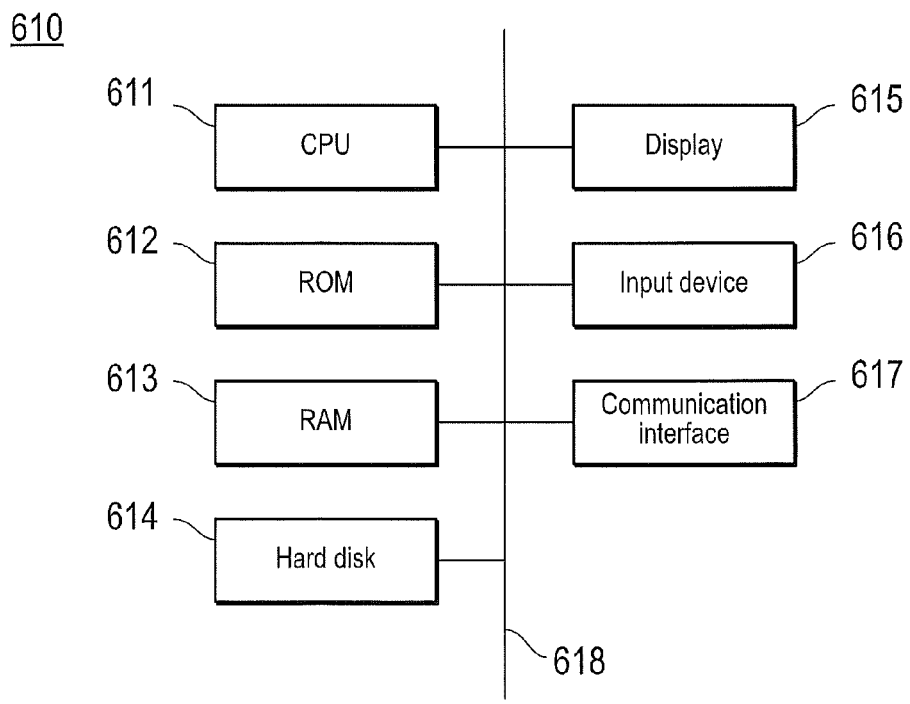
FIG. 10 is a block diagram showing the configuration of the PC shown in FIG. 9.

FIG. 10 is a block diagram showing the configuration of the PC shown in FIG. 9. The PC 610 has, as a printing instruction apparatus, a CPU 611, a ROM 612, a RAM 613, a hard disk 614, a display 615, an input device 616, and a communication interface 617, all of which are connected with each other via a bus 618 to exchange signals.

The CPU 611 controls various units described above and executes multiple types of arithmetic operations in accordance with its program. The ROM 612 stores various programs and various kinds of data. The RAM 613 temporarily stores programs and data as a work area. The hard disk 614 stores various programs including the operating system (OS) and various kinds of data.

The display 615 is typically a liquid crystal display capable of displaying multiple types of information. The input device 616 includes a pointing device such as a mouse or a keyboard, and it is used for entering various input data. The communication interface 617 is an interface for communicating with other kinds of equipment via the network 650, in which standards such as Ethernet, Token Ring and FDDI are used.

A document file preparation application for preparing document files and a printer driver 700 (refer to FIG. 11) are installed on the hard disk 614. Also, the updating tool 800 (refer to FIG. 12) is stored for updating the printer driver 700 on the hard disk 614 in the present embodiment.

The printer driver 700 is a program installed on the OS stored on the PC 610 for generating print jobs. In the present embodiment, the printer driver 700 is capable of displaying the information of a plurality of printers on the network 50 as a list on the operating screen (not shown), and allows the user to select a printer from the plurality of printers by operating the operating screen.

Figure 11:
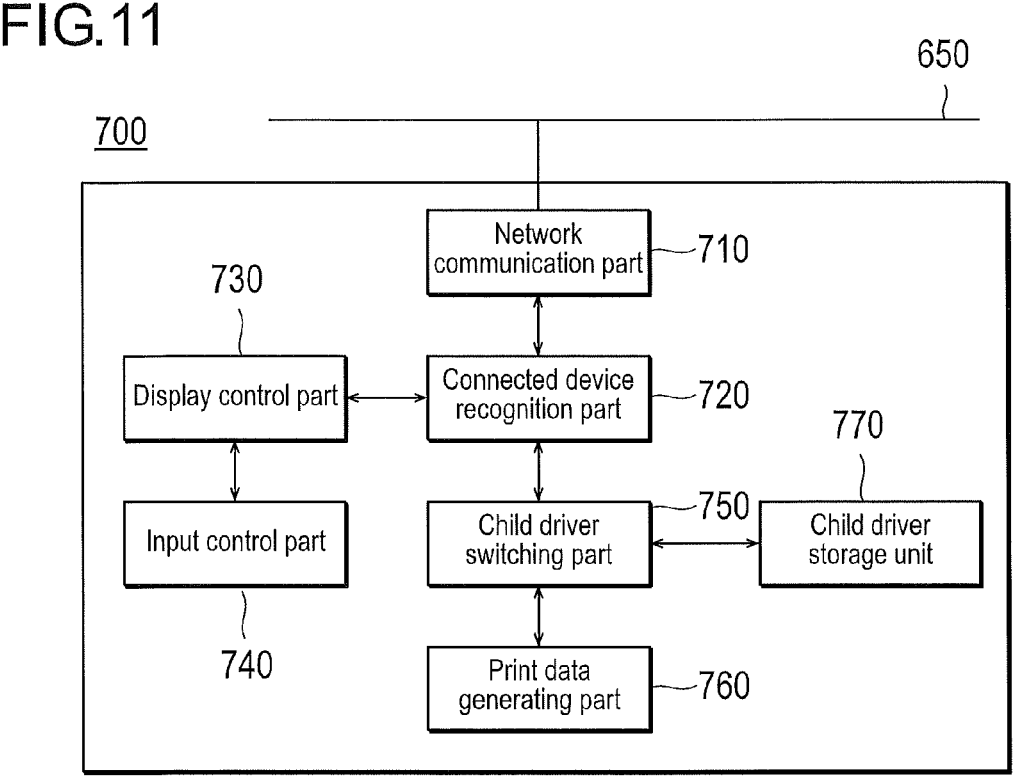
FIG. 11 is a block diagram showing the function of a printer driver.

FIG. 11 is a block diagram showing the function of the printer driver.

The printer driver 700 has a network communication part 710, a connected device recognition part 720, a display control part 730, an input control part 740, a child driver switching part 750, a print data generating part 760, and a child driver storage unit 770. The child driver storage unit 770 stores a plurality of child drivers corresponding with various models of printers. The network communication part 710, the connected device recognition part 720, the display control part 730, the input control part 740, the child driver switching part 750, and the print data generating part 760 are common modules for realizing functions that are common among various models of printers, while the child drivers are individual modules for realizing functions unique to each printer. The printer driver 700 is stored in the hard disk 614 and is read out to the RAM 613 and executed by the CPU 611 when activated. This causes the aforementioned functions of various modules of the printer driver 700 to be activated. These modules consist of program files such as DLL (Dynamic Link Library).

The network communication part 710 acquires the device information by communicating with the printers 620A-620E on the network 650. The device information includes the model name information and the FW version information of the printer. As specific technique of acquiring the device information, the public areas as well as private areas of SNMP (Simple Network Management Protocol) MIB (Management Information Base)-II specified by the RFC1213 as the network management technique are used.

The connected device recognition part 720 recognizes the device information acquired by the network communication part 710 and specifies the model name and the version number of a firmware of a printer. The model name and the version number thus specified are handed over to the display control part 730.

The display control part 730 displays the information concerning the printer handed over by the connected device recognition part 720. The display control part 730 displays the model name and the version number of the printer found on the network 650 on the operating screen which is displayed on the display 615 of the PC 610.

The input control part 740 receives the information entered by the user for selecting a printer among a plurality of printers. The input control part 740 receives the selection of a printer by the user among the plurality of printers displayed on the operating screen. Alternatively, the input control part 740 can receive the direct input of the model name and the version number by the user. Alternatively, the input control part 740 can receive the selection of a printer by the user among the plurality of printers included in the history of usage.

The child driver switching part 750 switches the child driver in accordance with the printer specified as the output destination. The child driver switching part 750 switches to an appropriate child driver when the one printer selected by the user via the operating screen is different from the currently selected printer. As described before, the child driver is a program file, e.g., DLL, and operates in coordination with other modules contained in the printer driver 700. The child driver realizes the function for outputting the setting information concerning a function unique to the printer or the function for providing an operating screen (printing setting screen) for setting up the particular setting information. The functions unique to a printer include printing functions such as a password printing function for the security purpose and a draft printing function for suppressing the toner consumption amount, post-processing functions such as stapling, punching, folding and gluing process, and the bidirectional communication function between the PC and the printer.

The print data generating part 760 generates the print data which will be converted into bitmap image data at each printer and the instruction data for instructing the printers' post-processes such as stapling, punching, and folding. The print data and the instruction data are transmitted as a print job to the printer of the output destination.

Next, let us describe the updating tool used for updating the printer driver 700.

Figure 12:
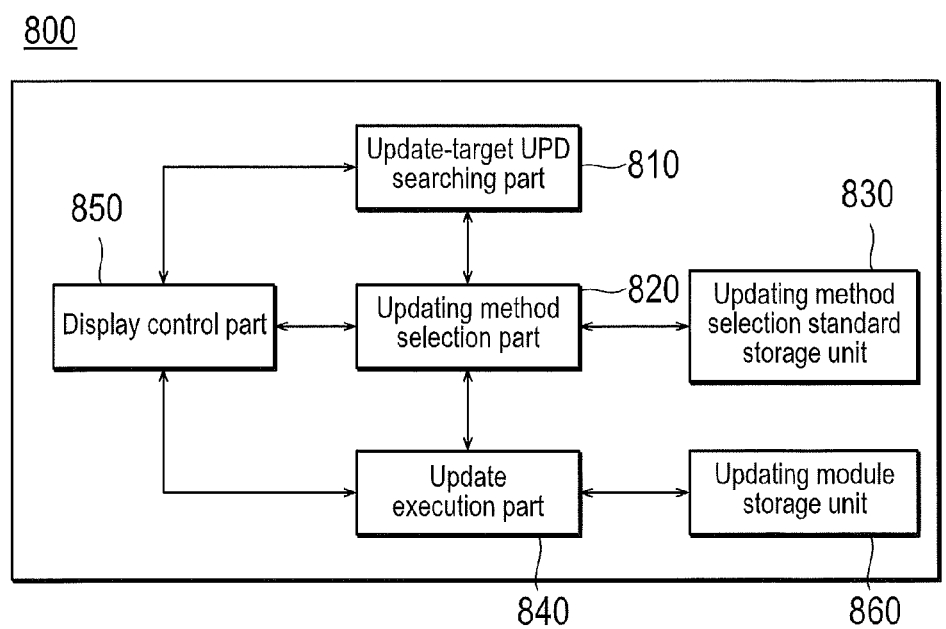
FIG. 12 is a block diagram showing the function of an updating tool.

FIG. 12 is a block diagram showing the function of an updating tool. The updating tool 800 is a program for overwriting or adding the child driver to the printer driver 700 installed on the PC 610.

The updating tool 800 has an update-target UPD searching part 810, an updating method selection part 820, an updating method selection standard storage unit 830, an update execution part 840, a display control part 850, and an updating module storage unit 860. The updating method selection standard storage unit 830 stores an information table that correlates the version number of each child driver and the updating method for the child driver. The updating module storage unit 860 stores a plurality of child drivers of the new versions for individual printer models.

The update-target UPD searching part 810 searches the printer driver of the update-target installed in the PC 610. The update-target UPD searching part 810 checks the existence of the printer driver in the PC 610, and makes a judgment as to whether or not the printer driver is the update-target printer driver based on the version number of the printer driver confirmed to exist.

The updating method selection part 820 selects either to execute the overwriting process or the addition process concerning each child driver of the update-target printer driver. The updating method selection part 820 selects either the overwriting process or the addition process based on the version number of the child driver with reference to the information table stored in the updating method selection standard storage unit 830.

The update execution part 840 executes overwriting process or addition process to the child driver according to the selection result of the updating method selection part 820. In case when overwriting process is selected by the updating method selection part 820, the update execution part 840 overwrites the program of the old version of the child driver with the program of the new version. In case when addition process is selected by the updating method selection part 820, the update execution part 840 adds the program of the new version of the child driver to the printer driver 700 separately from the program of the old version.

The display control part 850 displays a notifying screen (not shown) for notifying the execution result or the execution status of the updating process to the user.

Figure 13:
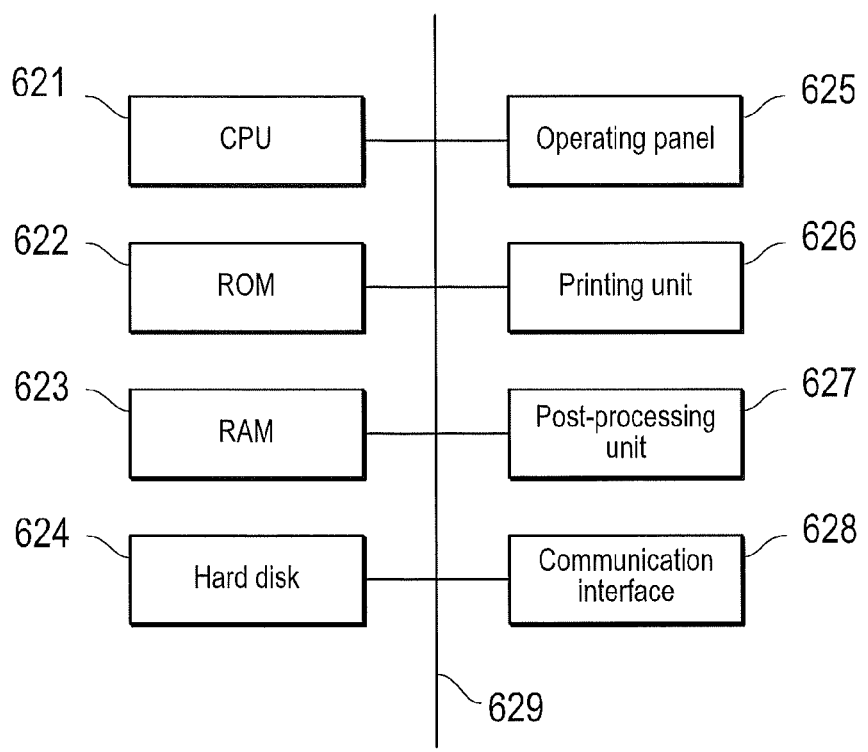
FIG. 13 is a block diagram showing the configuration of the printer shown in FIG. 9.

FIG. 13 is a block diagram showing the configuration of the printer shown in FIG. 9. The printers 620A-620E are constituted identical with each other, the printer 620A is used for describing them as a typical one.

The printer 620A comprises a CPU 621, a ROM 622, a RAM 623, a hard disk 624, an operating panel 625, a printing unit 626, a post-processing unit 627, and a communication interface 628, all of which are connected with each other for exchanging signals via a bus 629. In order to avoid redundancy, the description of those units amongst the aforementioned units of the printer 620A having the identical functions as those of the PC 610 is omitted here.

The operating panel 625 is used for displaying various information and inputting various instructions. The printing unit 626 prints the image based on the bitmap image data on a recording media such as a sheet of paper using the publicly known imaging process, e.g., the electro-photographic process, etc. The post-processing unit 627 executes post-processes such as stapling, punching, and folding processes to the sheet of paper on which printing is executed by the printing unit 626.

The storage units such as the RAM 623 and the hard disk 624 are assigned with a print job storage part for storing the print job. The hard disk 624 has areas for storing programs corresponding to the network communication part and a control part.

The network communication part provides information related to the printer 620A (e.g., device information) corresponding to requests from PC 610. Consequently, the network communication part is equipped with MIB. The network communication part receives the print job from the PC connected to the network 650.

The control part controls the supply of the print job to the printing unit 626. The control part reads out a print job from the print job storage part if the printing unit 626 is not printing and transmits it to the printing unit 626, and stores the print job in the print job storage part if it is involved in printing. The functions of the network communication part and the control part are implemented as the CPU 621 executes the corresponding programs. If it is desired to fix problems of these functions, the firmware including the corresponding programs is updated. The firmware is updated also when it is desired to add or modify the password printing function, the draft printing function, the watermarking function for printing watermarks on the sheet of paper, the user certification function for charging fares to the user and other functions. The firmware is also updated when a new post-processing function is added to the printer.

The PC 610 and the printers 620A-620E may each include components other than those components mentioned above or may lack a portion of those components mentioned above.

Next, let us now describe the process of updating the printer driver 700 installed on the PC 610 with reference to FIGS. 14-18.

Figure 14:
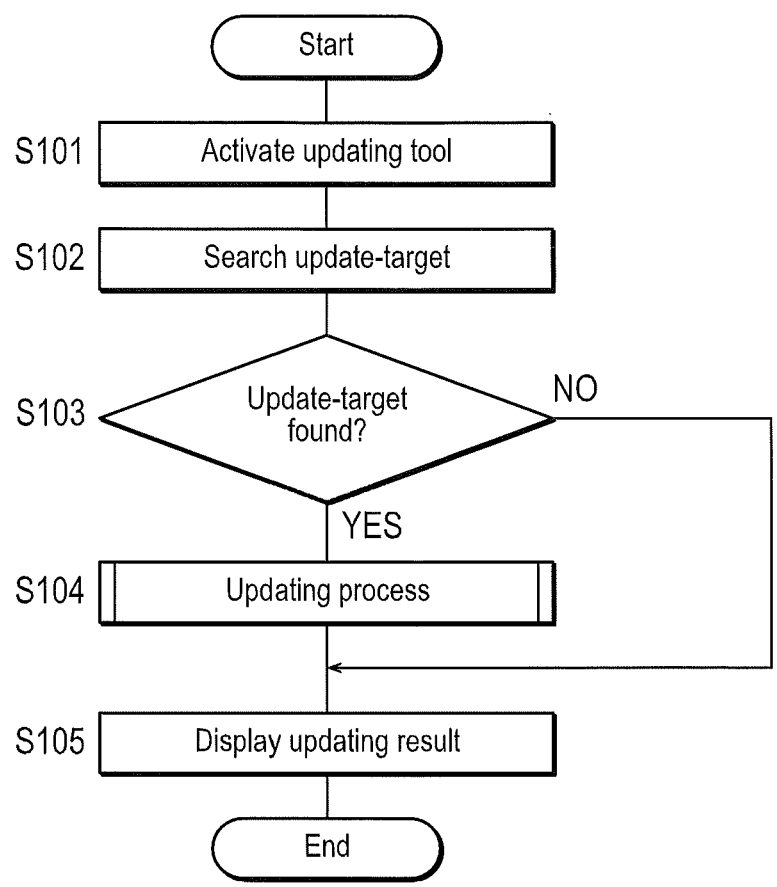
FIG. 14 is a flowchart showing the procedure of the printer driver updating process executed by the PC shown in FIG. 9.

FIG. 14 is a flowchart showing the procedure of the printer driver updating process executed by the PC shown in FIG. 9. The algorithm shown in the flowchart of FIG. 14 is stored as a program in the hard disk 614 of the PC 610 and is executed by the CPU 611.

In the printer driver updating process, the updating tool 800 is activated first (step S101). For example, as the user operates the mouse and press (click) the icon of the updating tool 800, the updating tool 800 becomes activated. Alternatively, different from the present embodiment, if the updating tool 800 is provided by a recording medium such as a CD (Compact Disc) or a DVD (Digital Versatile Disc), the updating tool 800 can be automatically activated as the recording medium is inserted into the PC 610.

Next, the update-target is searched (step S102). In the present embodiment, it is searched whether or not a printer driver that can be the update-target exists in the PC 610. More specifically, it is first confirmed that a printer driver exists in the folder inside the PC 610 where printer driver should be stored. Next, a judgment is made as to whether or not the printer driver is the printer driver to be updated based on the version number of the printer driver whose existence is confirmed. In the present embodiment, it is judged that the printer driver produced before the updating tool 800 in time is the printer driver to be updated based on the version number. Furthermore, the version information showing the version number of the printer driver 700 is stored, for example, in a dedicated file contained in the printer driver 700 in order to make the version information to be recognized more easily.

Next, a judgment is made as to whether or not the update-target is found (step S103). In the present embodiment, a judgment is made as to whether or not the printer driver 700 to be updated is found in the process shown in step S102.

If it is judged that the update-target is not found (step S103: No), it moves on to the process of step S105. On the other hand, if it is judged that the update-target is found (step S103: Yes), the updating process is executed (step S104). In the present embodiment, the printer driver is updated by selecting either the overwriting process or the addition process for each child driver and applying the selected process to it for a plurality of child drivers included in the printer driver. The detail of the updating process shown in the step S104 will be described later.

The updating result is then displayed (step S105), and the process is terminated. In the present embodiment, it is displayed on the display 615 that either the fact that the update-target printer driver does not exist, or that a child driver is overwritten or a child driver is added. Moreover, if an error occurs, the occurrence is displayed on the display 615.

Figure 15:
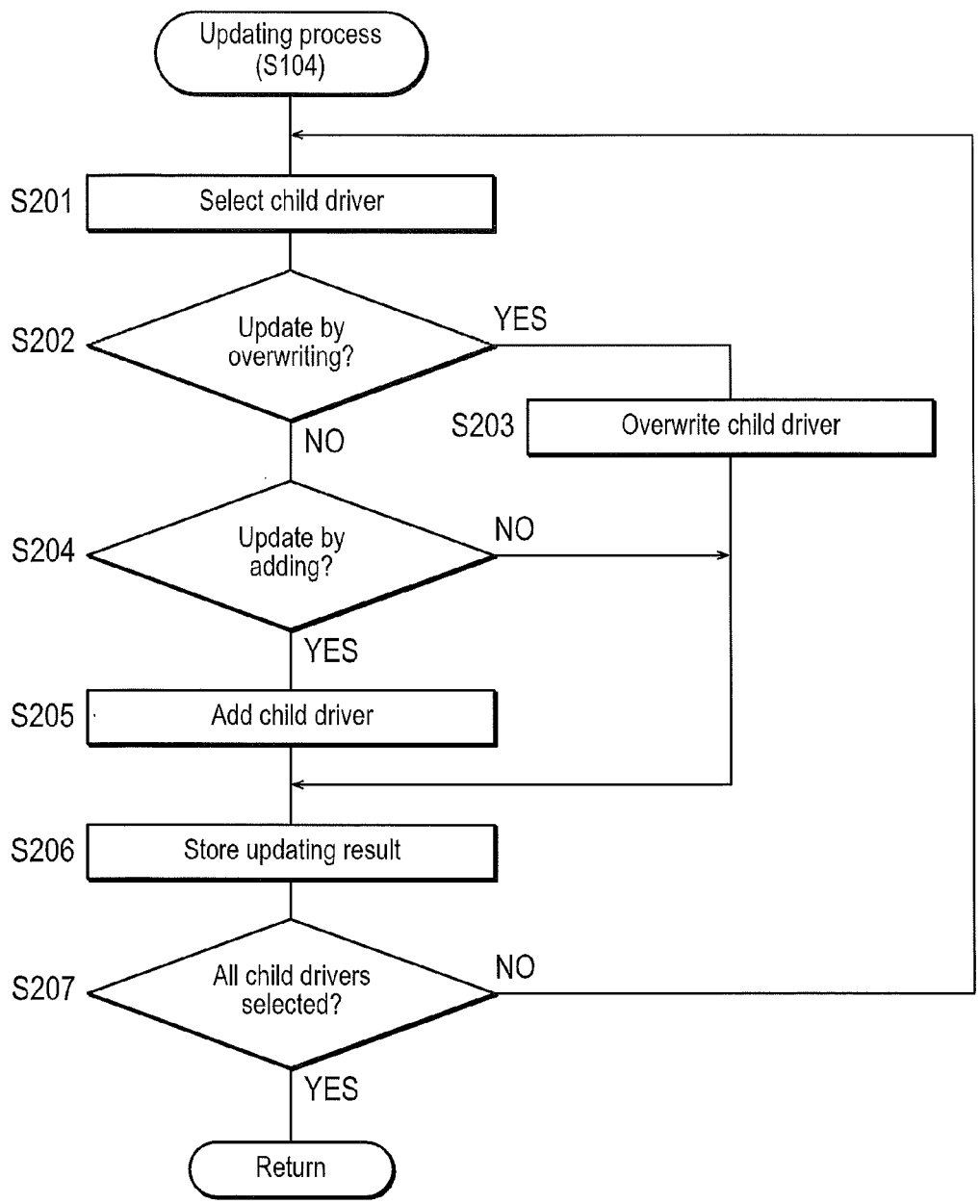
FIG. 15 is a flowchart showing the procedure of the updating process shown in step S104 of FIG. 14.

FIG. 15 is a flowchart showing the procedures of the updating process shown in step S104 of FIG. 14.

In the updating process, a child driver is selected first (step S201). In the present embodiment, a child driver to be updated is selected from a plurality of child drivers included in the printer driver 700. More specifically, a child driver of an old version having the same model name as that of the child driver of the new version stored in the updating tool 800 is selected from a plurality of child drivers stored in the printer drier 700 as a child driver to be processed.

Next, a judgment is made as to whether or not the updating method is overwriting (step S202). In the present embodiment, a judgment is made as to whether or not the child driver of the old version will be overwritten with the child driver of the new version based on the version number of the child driver of the new version corresponding to the child driver selected in the process shown in step S201. In the present embodiment, a judgment is made as to whether or not the updating method is overwriting based on the version number of the child driver of the new version in reference to the information table that relates the child driver's version number with the child driver's updating method. The version information showing the version number of the child driver is stored in a dedicated file contained in the child driver.

If it is judged that the updating method is overwriting (step S202: Yes), the child driver is overwritten (step S203). In the present embodiment, the child driver of the old version selected in the process shown in step S201 is overwritten with the child driver of the new version provided by the updating tool 800. As mentioned before, a child driver is a program file such as DLL and a program file of an old version is overwritten with a program file of a new version. In the present embodiment, before the child driver of the old version is overwritten with the child driver of the new version, the child driver of the old version is copied to an open region of the hard disk 614 after the file name is modified. According to such a configuration, even in case where the child driver of the old version is overwritten with the child driver of the new version, it is possible to interrupt the overwriting process in the middle of the process and restore the original state as the copy of the child driver of the old version exists. Also, by storing the child driver of the old version, it is possible to restore the printer driver 700 easily to the original state as needed even after the overwriting process is completed.

Figure 16:
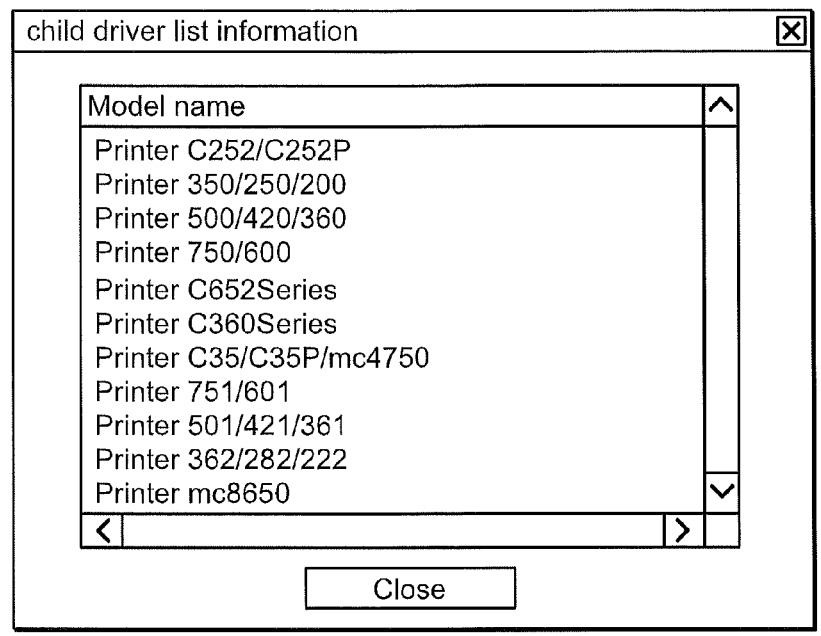
FIG. 16 is a diagram for describing a printer driver in which a child driver of an old version is overwritten with a child driver of a new version.
Figure 16:
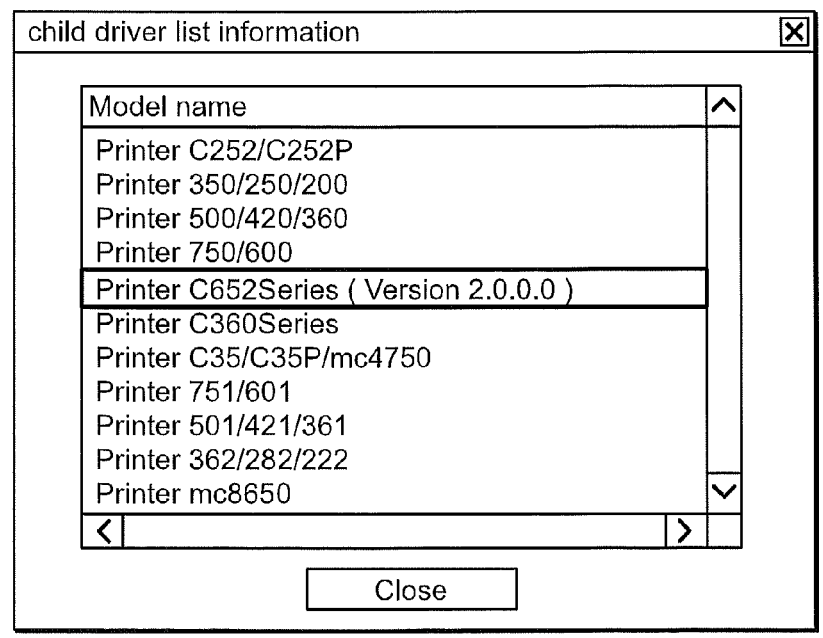

FIG. 16 is a diagram for describing a printer driver in which a child driver of an old version is overwritten with a child driver of a new version. FIG. 16(A) is a diagram showing a child driver list screen 910*a* of a printer driver before an update and FIG. 16(B) is a diagram showing a child driver list screen 910*b* of a printer driver after the update. The child driver list screens 910*a* and 910*b* are generated based on the configuration information stored in the child driver storage unit 770. The configuration information includes the information of the child driver contained in the printer driver 700 and is modified by the function of the updating tool 800 at the time of updating the printer driver 700.

In an overwriting process, a child driver of an old version is overwritten with a child driver of a new version. In FIG. 16, a child driver of an old version with a model name of "Printer C652 Series" is overwritten with a child driver of a new version with a model name of "Printer C652 Series (Version 2.0.0.0)."

On the other hand, if it is judged that the updating method is not overwriting in the process shown in step 202 (step S202: No), a judgment is made further as to whether or not the updating method is addition (step S204). In the present embodiment, a judgment is made as to whether or not a child driver of a new version will be added to the printer diver 700 separately from the child driver of the old version based on the version number of the child driver of the new version corresponding to the child driver selected in the process shown in step S201. In the present embodiment, a judgment is made as to whether or not the updating method is addition based on the version number of the child driver of the new version in reference to the information table that relates the child driver's version number with the child driver's updating method.

If it is judged that the updating method is not addition (step S204: No), it moves on to the process of step S206. On the other hand, if it is judged that the updating method is addition (step S204: Yes), the child driver is added (step S205). In the present embodiment, a child driver of a new version provided by the updating tool 800 is added to the printer driver 700 separately from the child driver of the old version selected in the process shown in step S201.

FIG. 17 is a diagram for describing a printer driver to which a child driver of a new version is added separately from a child driver of an old version. FIG. 17(A) is a diagram showing a child driver list screen 920*a* of a printer driver before an update and FIG. 17(B) is a diagram showing a child driver list screen 920*b* of a printer driver after the update. In an addition process, a child driver of an old version and a child driver of a new version coexist inside the printer driver 700. In FIG. 17, a child driver of the old version with a model name of "printer C652 Series" does not get deleted, but rather a child driver of an old version with a model name of "printer C652 Series (Version 1.2.3.4)" is coexisting with a child driver of a new version with a model name of "printer C652 Series (Version 1.2.4.0)."

As shown in FIG. 17(B), the version numbers of both the child driver of the old version and the child driver of the new version are displayed on the child driver list screen 920*b* provided by the printer driver 700 after the update in the present embodiment. With such a configuration, the user can recognize both child drivers of the same model of different versions.

In FIG. 17(B), the version number of only the child driver added with the new version is displayed. However, it can also be configured to display the version numbers of all the child drivers on the child driver list screen 920*b*. Moreover, the addition process described above is particularly effective in case where the child driver lacks the downward compatibility.

Next, the updating result is stored (step S206). In the present embodiment, the updating result is stored in the RAM 613, for example, in order to notify the updating result to the user in the process shown in the step S105 of FIG. 14.

Next, a judgment is made as to whether or not all the child drivers are selected (step S207). In the present embodiment, a judgment is made as to whether or not all the process-target child drivers included in the printer driver 700 are selected.

If it is judged that not all the child drivers are selected (step S207: No), the processes of step S201 and thereafter are repeated until all the child drivers are selected. On the other hand, if it is judged that all the child drivers are selected (step S207: Yes), the process is terminated.

As can be seen from the above, a selection of either the overwriting process or the addition process is made for each child driver and the printer driver is updated based on the selection result according to the flowchart shown in FIG. 15. More specifically, if the overwriting process is selected, a child driver of an old version is overwritten with a child driver of a new version. On the other hand, if the addition process is selected, a child driver of a new version is added to the printer driver 700 separately from the child driver of the old version.

With such a configuration, it is possible to select the overwriting process to make the child driver of the old version unusable if the printer driver needs to be updated due to the reason of the child driver itself, while it is possible to make both child drivers of the new version and the old version usable by selecting the addition process if the updating is needed because of the reason of the printer. In other words, it is possible to deal with the printers of the same model of different versions with one printer driver, without making the unnecessary child driver of the old version usable by the user. Also, such a configuration makes it possible to select the overwriting process to save the memory resources.

As shown above, the present embodiment makes it possible to choose between the overwriting process and the addition process of the child driver of the new version arbitrarily when updating a printer driver capable of controlling printers of various models. Therefore, it makes it possible to update the printer driver depending on updating reasons, thus increasing the user's convenience.

Moreover, in the above embodiment, either the overwriting process or the addition process is selected for each child driver by referencing the information table stored in the updating method selection standard storage unit 830, where the version number of each child driver is related with the updating method.

However, the method of selecting the updating method of the child driver is not limited to the above embodiment. For example, it can be configured to store an information table that correlates the version number of the printer driver 700 and the updating method of each child driver included in the printer driver 700 in advance, and to select the updating method of the child driver from the version number of the printer driver 700.

Alternatively, it can also be configured to select the updating method of the child driver by comparing the version number of a child driver of an old version with the version number of the child driver of a new version. For example, in case of the overwriting process, the version number is assigned to the child driver of a new version in such a way as to increment the highest-order digit, while in case of the addition process, the version number is assigned to the child driver of a new version in such a way as to increment the third-order digit. With such a configuration, if the version number of a child driver of an old version is "Version 1.2.3.4" and the version number of the child driver of a new version is "Version 2.0.0.0," for example, the overwriting process of the child driver is selected. On the other hand, if the version number of a child driver of an old version is "Version 1.2.3.4" and the version number of the child driver of a new version is "Version 1.2.4.0," for example, the addition process of the child driver is selected. Thus, it is possible to select the updating method of the child driver without referencing the information table.

Alternatively, the updating method of the child driver can be selected based on the FW version information acquired from the printer. In this case, for example, it is judged that it is an update due to the reason of the printer driver itself if the time of manufacture of the particular firmware specified by the version of the firmware is prior to a specified time, so that the overwriting process is selected. On the other hand, it is judged that it is an update due to the reason of the printer if the time of manufacture is after a specified time, so that the addition process is selected. With such a configuration, only the child drivers that correspond to the printers residing on the network 50 are overwritten or added, so that the overwriting or addition processes for child drivers that are unnecessary to the user are omitted. In addition, the time for the updating process of the printer driver 700 is shortened.

Alternatively, either the overwriting process or the addition process can be selected by the user operating on the selection screen provided by the updating tool 800.

Lastly, let us describe the version number assigned to the printer driver.

In the embodiment described above, there can be a case where an updating result obtained by updating a printer driver of version A is different from an updating result obtained by updating the printer driver of version B as a result of updating a printer driver for each child driver individually.

In order to deal with this, the version numbers of the printer drivers to be updated and the version numbers after the updates are stored in advance in the updating tool 800 so that the version information indicating the version number of the printer driver 700 can be modified appropriately according to how the printer driver 700 is updated at the time of the updating processes.

More specifically, as indicated in version information indicating screens 1110 and 1120 shown in FIG. 18, the version number of the printer driver with an old version "1.2.1.0" is modified to "1.3.0.0," while the version number of the printer driver with an old version "1.10.1.0" is modified to "1.11.1.0." With such a configuration, it is possible to recognize a child driver included in a printer driver by the version number.

The present invention shall not be construed to be limited by the embodiment described above but rather it can be modified in a various way within the claims.

For example, in the embodiment described above, the updating tool is activated on the PC on which a printer driver is installed to update the printer driver. However, it can be configured in such a manner as to have the updating tool to be activated on another PC connected via the network to the PC on which the printer driver is installed.

Also, in the embodiment described above, a printer driver is updated by selecting either the overwriting process or the addition process for each child driver individually. However, it can also be configured in such a manner as to select an identical process to all the child drivers unanimously to execute the printer driver update.

Furthermore, in the embodiment described above, either the overwriting process or the addition process is executed for the child drivers. However, it can be so configured in such a manner as to select either the overwriting process or the addition process for modules other than the child drivers and to execute the selected process.

The procedures and methods of conducting various processes according to the first and second embodiments can be realized either by a dedicated hardware circuit, or by a programmed computer. The printer driver updating programs described above and the groups of files required for them can be provided either by a computer readable recording medium such as a flexible disk, CD-ROM, DVD, and flash memory, or on-line via a network such as the Internet. In such a case, the program recorded on the computer readable recording medium is normally transferred to and stored on a storage unit such as a hard disk. Moreover, the printer driver updating programs described above and the groups of files required for them can be provided either as an application unique to an updating package, or as an application attached to printing device such as a printer.

What is claimed is:

1. A non-transitory computer readable recording medium stored with a printer driver updating program, said program causing a computer to execute a process comprising:
 (a) confirming whether or not a printer driver for a first operating system, which is a printer driver for the first operating system that operates on a computer, exists;
 (b) confirming whether or not a printer driver for a second operating system, which is a printer driver for the second operating system which second operating system is different from the first operating system operating on said computer, exists;
 (c) acquiring each version of said printer driver for the first operating system whose existence is confirmed in said step (a) and of said printer driver for the second operating system whose existence is confirmed in said step (b), respectively;
 (d) selecting whether or not to update said printer driver for the first operating system and said printer driver for the second operating system, respectively, according to a predetermined updating method corresponding to said versions acquired in said step (c); and
 (e) updating said printer driver for the first operating system and/or said printer driver for the second operating system selected to be updated in said step (d);
 wherein in said updating program, when the printer driver for the first operating system exists but is not of an update-target version and the printer driver for the second operating system exists and is of an update-target version, the updating process is not executed; and
 wherein in said updating program, when the printer driver for the first operating system exists and is of the update-target version and the printer driver for the second operating system exists but is not of the update-target version, the updating process is not executed.

2. The non-transitory computer readable recording medium as claimed in claim 1, wherein in said updating program, when the printer driver for the first operating system exists and is of the update-target version and no printer driver for the second operating system exists, the printer driver for the first operating system is updated.

3. The non-transitory computer readable recording medium as claimed in claim 1, wherein in said updating program, when both printer drivers for the first operating system and the second operating system exist and both are of the update-target versions, both printer drivers for the first operating system and the second operating system are updated.

4. The non-transitory computer readable recording medium as claimed in claim 1, wherein in said updating program, when only either the printer driver for the first operating system or the printer driver for the second operating system is a target to be updated, only the printer driver of the target to be updated is updated.

5. The non-transitory computer readable recording medium as claimed in claim 1, wherein
the printer driver comprises a plurality of files each of which corresponds to each one of a plurality of functions, and
in said step (e), the printer driver is updated by either overwriting the files that constitute said printer driver with files provided together with the printer driver updating program or by adding the files provided together with the printer driver updating program to said printer driver.

6. The non-transitory computer readable recording medium as claimed in claim 5, wherein
said printer driver is a universal printer driver that corresponds with a plurality of printers having different functions, and
said files that constitute said printer driver are files of a common function part for causing a plurality of printers to execute common functions, and files of a model-specific function part for causing the printers to execute model-specific functions.

7. The non-transitory computer readable recording medium as claimed in claim 1, wherein
said process further comprising:
(f) confirming with the user whether or not the printer driver of the update-target version should be updated, prior to the execution of the update in said step (e).

8. The non-transitory computer readable recording medium as claimed in claim 7, wherein
said step (f) is executed only when said version acquired in said step (c) is of a predetermined special specification.

9. The non-transitory computer readable recording medium as claimed in claim 1, wherein
said process further comprising:
(g) selecting either an overwriting process for overwriting the program of a module of a new version on the program of an old version already existing in the printer driver, or an addition process for adding said program of the new version to said printer driver separately from said program of the old version, for said module which realizes specified functions of said printer driver; and
(h) updating said printer driver by executing the process selected in said step (g).

10. The non-transitory computer readable recording medium as claimed in claim 9, wherein
said program of the new version has version information that shows the version of said program, and
in said step (g), either said overwriting process or addition process is selected based on said version information of the program of the new version.

11. The non-transitory computer readable recording medium as claimed in claim 9, wherein
said process further comprising:
(i) acquiring information concerning firmware of the printer from said printer, wherein
in said step (g), either said overwriting process or addition process is selected based on said information of the firmware of said printer acquired in said step (i).

12. The non-transitory computer readable recording medium as claimed in claim 9, wherein
in said step (g), either said overwriting process or addition process is selected based on a user's operation.

13. The non-transitory computer readable recording medium as claimed in claim 9, wherein
when said addition process is selected in said step (g), both versions of said programs of the new version and the old version are displayed respectively in addition to the names of said programs of the new version and the old version on an operating screen provided by said printer driver.

14. The non-transitory computer readable recording medium as claimed in claim 9, wherein
when said overwriting process is selected in said step (g), said program of the old version is stored in a storage unit under a different name before said program of the old version is overwritten with said program of the new version in said step (h) so that said overwriting process can be interrupted during the execution of said overwriting process.

15. The non-transitory computer readable recording medium as claimed in claim 9, wherein
in said step (g), either said overwriting process or addition process is selected for the module of the printer driver, and
in said step (h), the process selected in said step (g) is executed for the module.

16. The non-transitory computer readable recording medium as claimed in claim 9, wherein
said printer driver has configuration information showing modules that constitute said printer driver and version information showing a version of said printer driver, and
said configuration information and version information are modified when said printer driver is updated in said step (h).

17. The non-transitory computer readable recording medium as claimed in claim 16, wherein
said version information of said printer driver is modified in accordance with how the printer driver is updated.

18. The non-transitory computer readable recording medium as claimed in claim 9, wherein
said printer driver has common modules for realizing common functions for various models of printers and individual modules for realizing unique functions for each printer, and
in said step (g), either said overwriting process or addition process is selected for each of said individual modules.

19. A printer driver updating method, comprising:
(a) confirming whether or not a printer driver for a first operating system, which is a printer driver for the first operating system that operates on a computer, exists;
(b) confirming whether or not a printer driver for a second operating system, which is a printer driver for the second the operating system different from the first operating system operating on said computer, exists;
(c) acquiring each version of said printer driver for the first operating system whose existence is confirmed in said step (a) and of said printer driver for the second operating system whose existence is confirmed in said step (b) respectively;

(d) selecting whether or not to update said printer driver for the first operating system and said printer driver for the second operating system respectively according to a predetermined updating method corresponding to said versions acquired in said step (c); and (e) updating said printer driver for the first operating system and/or said printer driver for the second operating system selected to be updated in said step (d);

wherein in said updating method, when the printer driver for the first operating system exists but is not of an update-target version and the printer driver for the second operating system exists and is of an update-target version, the updating process is not executed; and wherein in said updating method, when the printer driver for the first operating system exists and is of the update-target version and the printer driver for the second operating system exists but is not of the update-target version, the updating process is not executed.

20. The printer driver updating method as claimed in claim 19, wherein in said updating method, when the printer driver for the first operating system exists but is not of the update-target version and the printer driver for the second operating system exists and is of the update-target version, or when the printer driver for the first operating system exists and is of the update-target version and the printer driver for the second operating system exists but is not of the update-target version, the updating is not executed.

21. The printer driver updating method as claimed in claim 19, wherein in said updating method, when the printer driver for the first operating system exists and is of the update-target version and no printer driver for the second operating system exists, the printer driver for the first operating system is updated.

22. The printer driver updating method as claimed in claim 19, wherein in said updating method, when both printer drivers for the first operating system and the second operating system exist and both are of the update-target versions, both printer drivers for the first operating system and the second operating system are updated.

23. The printer driver updating method as claimed in claim 19, wherein in said updating method, when only either the printer driver for the first operating system or the printer driver for the second operating system is a target to be updated, only the printer driver of the target to be updated is updated.

24. The printer driver updating method as claimed in claim 19, wherein
the printer driver comprises a plurality of files each of which corresponds to each one of a plurality of functions, and
in said step (e), the printer driver is updated by either overwriting the files that constitute said printer driver with files provided for the printer driver or by adding the files provided for the printer driver to said printer driver.

25. The printer driver updating method as claimed in claim 24, wherein
said printer driver is a universal printer driver that corresponds with a plurality of printers having different functions, and
said files that constitute said printer driver are files of a common function part for causing a plurality of printers to execute common functions, and files of a model-specific function part for causing the printers to execute model-specific functions.

26. The printer driver updating method as claimed in claim 19, further comprising:

(f) confirming with the user whether or not the printer driver of the update-target version should be updated, prior to the execution of the update in said step (e).

27. The printer driver updating method as claimed in claim 26, wherein
said step (f) is executed only when said version acquired in said step (c) is of a predetermined special specification.

28. The printer driver updating method as claimed in claim 19, further comprising:
(g) selecting either an overwriting process for overwriting the program of a module of a new version on the program of an old version already existing in the printer driver, or an addition process for adding said program of the new version to said printer driver separately from said program of the old version, for said module which realizes specified functions of said printer driver; and
(h) updating said printer driver by executing the process selected in said step (g).

29. The printer driver updating method as claimed in claim 28, wherein
said program of the new version has version information that shows the version of said program, and
in said step (g), either said overwriting process or addition process is selected based on said version information of the program of the new version.

30. The printer driver updating method as claimed in claim 28, further comprising:
(i) acquiring information concerning firmware of the printer from said printer, wherein
in said step (g), either said overwriting process or addition process is selected based on said information of the firmware of said printer acquired in said step (i).

31. The printer driver updating method as claimed in claim 28, wherein
in said step (g), either said overwriting process or addition process is selected based on a user's operation.

32. The printer driver updating method as claimed in claim 28, wherein
when said addition process is selected in said step (g), both versions of said programs of the new version and the old version are displayed respectively in addition to names of said programs of the new version and the old version on the operating screen provided by said printer driver.

33. The printer driver updating method as claimed in claim 28, wherein
when said overwriting process is selected in said step (g), said program of the old version is stored in a storage unit under a different name before said program of the old version is overwritten with said program of the new version in said step (h) so that said overwriting process can be interrupted during the execution of said overwriting process.

34. The printer driver updating method as claimed in claim 28, wherein
in said step (g), either said overwriting process or addition process is selected for the module of the printer driver, and
in said step (h), the process selected in said step (g) is executed for the module.

35. The printer driver updating method as claimed in claim 28, wherein
said printer driver has the configuration information showing the modules that constitute said printer driver and the version information showing the version of said printer driver, and said configuration information and version information are modified when said printer driver is updated in said step (h).

36. The printer driver updating method as claimed in claim 35, wherein
said version information of said printer driver is modified in accordance with how the printer driver is updated.

37. The printer driver updating method as claimed in claim 28, wherein
said printer driver has common modules for realizing common functions for various models of printers and individual modules for realizing unique functions for each printer, and
in said step (g), either said overwriting process or addition process is selected for the module.

* * * * *